United States Patent [19]

Kakimoto

[11] Patent Number: 5,036,574

[45] Date of Patent: Aug. 6, 1991

[54] MULTIPLE PIERCING APPARATUS AND METHOD

[75] Inventor: Masakazu Kakimoto, Aichi, Japan

[73] Assignee: Ushio Co., Ltd., Aichi, Japan

[21] Appl. No.: 429,486

[22] Filed: Oct. 31, 1989

[30] Foreign Application Priority Data

| | | | |
|---|---|---|---|
| Oct. 31, 1988 | [JP] | Japan | 63-276980 |
| Nov. 4, 1988 | [JP] | Japan | 63-280146 |
| Dec. 29, 1988 | [JP] | Japan | 63-333446 |
| Feb. 28, 1989 | [JP] | Japan | 1-23578[U] |

[51] Int. Cl.[5] .......................... B26D 5/00; B23B 39/16

[52] U.S. Cl. ...................................... 29/335; 408/1 R; 408/50; 408/51; 408/52; 408/53; 408/88; 408/69; 408/46; 408/13; 408/237; 408/68; 83/368; 83/402

[58] Field of Search ...................... 408/1 R, 34, 32, 42, 408/44, 46, 43, 16, 3, 13, 67, 68, 62, 64, 69, 70, 88, 31, 45, 50, 51, 52, 53, 130, 702, 236, 237, 8; 29/33 Q, 335, 563; 409/157, 158; 358/101

[56] References Cited

U.S. PATENT DOCUMENTS

| | | | |
|---|---|---|---|
| 3,022,000 | 2/1962 | Millis . | |
| 3,311,297 | 3/1967 | Williamson et al. . | |
| 3,518,756 | 7/1970 | Bennett et al. . | |
| 3,738,569 | 6/1973 | Killaly, Sr. | 234/43 |
| 4,094,944 | 6/1978 | Paetz | 264/137 |
| 4,407,614 | 10/1983 | Muhr et al. | 83/368 X |
| 4,532,843 | 8/1985 | Miyama | 29/568 |
| 4,539,058 | 9/1985 | Burgess et al. | 156/250 |
| 4,555,968 | 12/1985 | Raney et al. | 83/368 X |
| 4,621,407 | 11/1986 | Suzuki | 29/568 |
| 4,623,089 | 11/1986 | Scott | 234/114 |
| 4,628,578 | 12/1986 | Yajima | 83/371 X |
| 4,653,365 | 3/1987 | Takasaki et al. | 83/50 |
| 4,685,613 | 8/1987 | Schambre | 234/131 |
| 4,696,210 | 9/1987 | Cain et al. | 83/368 X |
| 4,845,556 | 7/1989 | Somers et al. | 358/101 |

FOREIGN PATENT DOCUMENTS

| | | | |
|---|---|---|---|
| 149109 | 9/1983 | Japan | 408/13 |
| 63-267195 | 11/1988 | Japan . | |

*Primary Examiner*—Larry I. Schwartz
*Assistant Examiner*—Robert Schultz
*Attorney, Agent, or Firm*—Sandler, Greenblum & Bernstein

[57] ABSTRACT

A multiple piercing apparatus for piercing a workpiece having a plurality of reference marks defining the piercing locations. A plurality of adjustably movable piercing unit cases are opposedly arranged on opposite sides of a machine bed. A piercing element, such as a twist drill or punching assembly, is mounted for movement with respect to the unit case to be aligned with a respective reference mark in response to data received from a sensor, such as a camera or photo-sensor.

54 Claims, 13 Drawing Sheets

FIG. 15(iii)
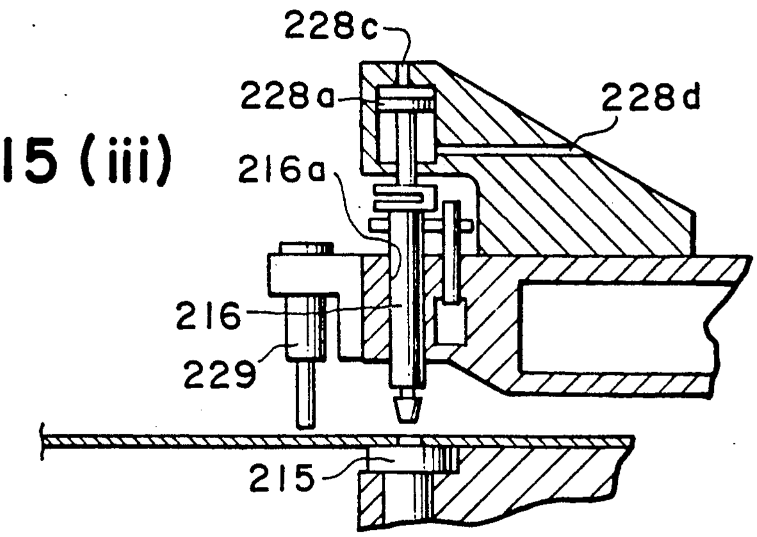

MULTIPLE PIERCING APPARATUS AND METHOD

BACKGROUND OF THE INVENTION

1. Field of the Invention

This invention relates to a multiple piercing apparatus, and more particularly to an apparatus for piercing sheet or plate material, such as a substrate or the like, by a piercing device such as a twist drill or punch assembly.

2. Description of Background and Relevant Information

In the manufacture of a substrate, it is generally known to form a perforation, such as a basis hole or the like, by a conventional type piercing apparatus such as a punch assembly or twist drill, which is adjustably fixed at a predetermined position. This includes a method of moving a workpiece itself for centering, and includes, in the piercing process of the above conventional method, initially printing a reference mark on a surface of the workpiece. Then, the workpiece is loaded on a piercing apparatus and moved to locate the mark adjacent the piercing assembly, so that the mark is viewed by an industrial camera for processing its image data in a microprocessor which communicates with a piercing mechanism, or the mark is manually viewed by an operator while using an optical instrument such as a reflex type sensor together with a fine control mechanism operated by hand. Through these methods of centering the mark, the workpiece is finally located at an accurate position substantially at the center axis line of the punch assembly or twist drill Then, the piercing is achieved by the punch assembly or twist drill.

Even though such piercing assembly is a multiple type, the above described steps, that is, the centering and piercing processes, are required for each respective piercing assembly.

In the above described conventional method, the workpiece itself is moved in the X-axis and Y-axis directions by clamping the workpiece on a work bed during its centering step. Therefore, it is only possible to treat a cut out type workpiece and not a continuous type sheet, making it impossible to make any piercing apparatus capable of handling a continuous type sheet in a conveyor type manufacturing line.

Therefore, it is an object of the present invention to provide a multiple piercing apparatus which is capable of accomplishing the necessary processes, such as centering and piercing, without any movement of the workpiece itself on the apparatus, thus making it possible to include such an apparatus in a continuous type manufacture line for a substrate.

SUMMARY OF THE INVENTION

The present invention is directed to a multiple piercing apparatus for piercing a workpiece having reference marks defining the locations on the workpiece to be pierced, wherein the workpiece is conveyed along a conveying path, and includes a machine bed located along the conveying path of the workpiece, a plurality of piercing units being opposedly arranged on both sides of the machine bed, each piercing unit being movable along the X-axis and Y-axis directions. Each piercing unit includes a work-space having an opening facing the machine bed, wherein the workpiece passes through respective work-spaces of opposed piercing units. Piercing means are located in each piercing unit for piercing the workpiece at the reference marks. Sensing means for locating the reference marks and a drive mechanism for moving the piercing means with respect to the piercing unit in response to a reference mark being located by the sensing means are located in each piercing unit.

The work-space includes a bottom floor and a hole located at an end portion of the bottom floor. The piercing means is located below the bottom floor, and elevating means elevate the piercing means through the hole. The piercing means may be a twist drill and the elevating means may be a fluid cylinder.

According to another aspect of the invention an elevatable workpiece clamp is arranged to clamp the workpiece around the periphery of the hole. The work-space includes a ceiling, and the sensing means is located on the ceiling and is substantially aligned with the hole. The sensing means may be a camera.

According to another aspect of the invention, the drive mechanism moves the piercing means along X-axis and Y-axis directions. The drive mechanism may include a support member for supporting the piercing means, and a motor having an eccentric cam which contacts the support member for moving the support member along at least one of the X-axis and Y-axis directions. A second motor having an eccentric cam contacts the support member for moving the support member along the other of the X-axis and Y-axis directions. Biasing means bias the support member into contact with the eccentric cam.

According to another aspect of the invention, a feed roller is provided on the bottom floor, the top of the feed roller being level with the end portion of the bottom floor. In a second embodiment of the invention, the mechanism includes a support member for supporting the piercing means, the support member being movable along at least one of the X-axis and Y-axis directions. The support member is substantially C-shaped and includes an upper member, a lower member, and a connecting member. The support member encircles the work-space and the opening of the C-shaped support member is substantially aligned with the opening of the work-space. The piercing means is supported on the lower member of the support member Elevating means elevates the piercing means. The elevating means is a fluid cylinder which is connected to the lower member of the support member. Sensing means is supported on the upper member of the support member and includes elevating means for elevating the sensing means. The drive mechanism includes a jackscrew having a cooperating element connected to the support member for moving the support member along at least one of the X-axis and Y-axis directions A second jackscrew moves the support member along the other of the X-axis and Y-axis directions. The cooperating element is connected to the lower member of the C-shaped support member. The sensing means may be a photo-sensor.

According to another aspect of the invention, the workspace and piercing means are disposed in a unit case, the drive mechanism moves the unit case along at least one of X-axis and Y-axis directions.

In a third embodiment of the invention, the work-space includes a bottom floor and a ceiling, and the piercing means is disposed in the ceiling. The piercing means is a punch assembly and a die is located at an end portion of the bottom floor, the die being substantially aligned with the punch assembly. The upper surface of the die is level with the bottom floor. Reciprocating means lower and raise the piercing means and the reciprocating means is a fluid cylinder disposed in the unit case. The sensing means is disposed in the ceiling.

The drive mechanism includes at least one rail connected to the machine bed, and means for moving moves the unit case along the rail in at least one of the X-axis and Y-axis directions. The rail is movable in the other of the X-axis and Y-axis directions. The means for moving includes a jackscrew cooperating with the unit case, the jackscrew being driven by a motor connected to the at least one rail. The rail is also movable by a jackscrew which is driven by a motor.

According to a fourth embodiment of the invention, the support member includes a first portion for moving the piercing means along the Y-axis direction and a second portion for moving the piercing means along the X-axis direction, wherein the second portion is slidable relative to the first portion in the X-axis direction. A first and second motor having eccentric cams which contact the support portions move the support member along the X-axis and Y-axis directions. The first portion of the support member is pivotally mounted on the piercing unit.

According to another aspect of the invention, an exhaust portion is located below the hole, and an air jet nozzle in the exhaust portion discharges any portion of the workpiece removed by the piercing means.

The invention is also directed to a method of piercing a workpiece, wherein the workpiece has reference marks defining the locations on the workpiece to be pierced, the method comprising:

(a) conveying the workpiece along a conveying path;
(b) providing at least one piercing unit having piercing means along the conveying path;
(c) sensing a reference mark by sensing means and stopping the conveyance of the workpiece;
(d) processing data from the sensing means to determine the coordinates of the reference mark;
(e) moving a piercing means to the coordinates of the reference mark; and
(f) piercing the workpiece.

The step of providing at least one piercing units includes providing a plurality of opposedly arranged piercing units on both sides of the conveying path and adjustably mounting the at least one piercing unit for movement along X-axis and Y-axis directions with respect to the conveying path. The method further comprises clamping the workpiece while it is being pierced and elevating the piercing means to pierce the workpiece. Alternatively the method may include lowering the piercing means to pierce the workpiece.

According to another aspect of the invention, the method includes supporting the piercing means on a support member and moving the support member with respect to the piercing unit so that the piercing means is substantially aligned with a reference mark. The support member is moved along the X-axis and Y-axis directions by at least one motor driving an eccentric cam which contacts the support member. The method further comprises biasing the support member against the eccentric cam. Alternatively, the support member is moved by at least one jackscrew which is driven by a motor.

The step of piercing the workpiece comprises piercing with a twist drill or with a punch assembly. The method further comprises emitting an air jet to discharge any portion of the workpiece removed by the piercing means.

BRIEF DESCRIPTION OF THE DRAWINGS

The invention is further explained in the description which follows with reference to the drawings illustrating, by way of non-limiting examples, various embodiments of the invention wherein.

DETAILED DESCRIPTION OF THE PREFERRED EMBODIMENTS

Figure 1:
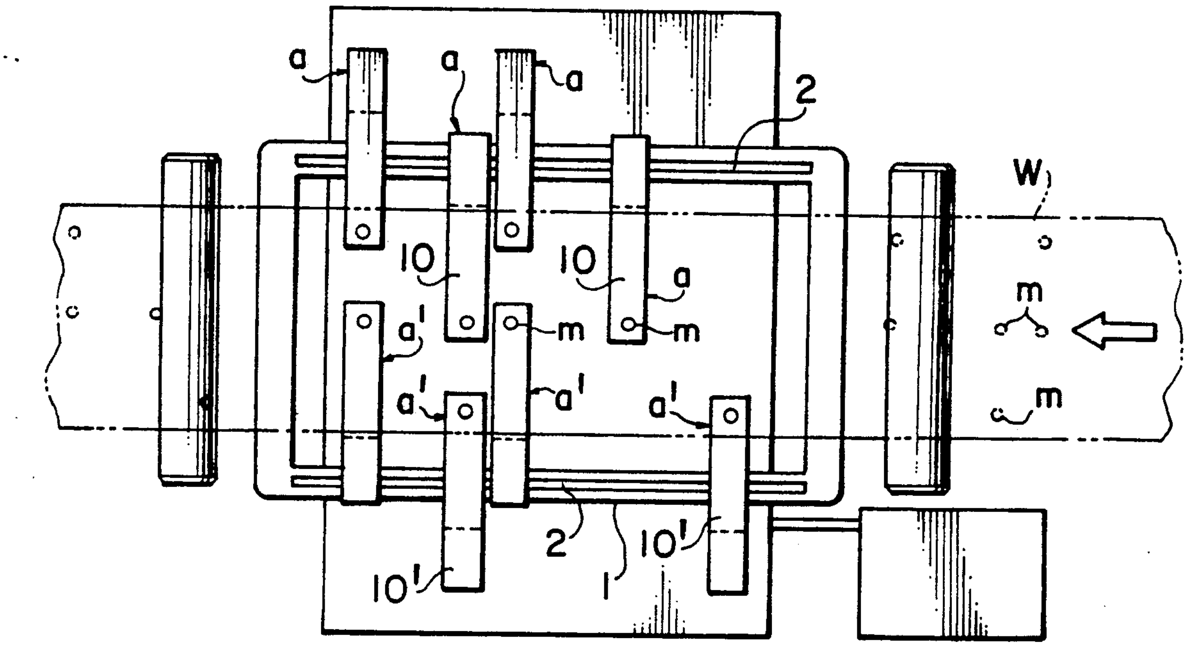
FIG. 1 is a plan view showing a first embodiment of an apparatus of the present invention.

The present invention is directed to a multiple piercing apparatus which includes a plurality of piercing assemblies within unit cases which are opposedly arranged on both sides of a machine bed. Each unit case is movable in X-axis and Y-axis directions for adjusting their respective positions. A work-space is provided in each unit case by forming a hollowed out space with an opening portion at one end of the unit case. The hollowed out spaces are positioned at the same level with each other and the machine bed, and the opening positions of the unit cases are arranged to oppose each other so as to allow a workpiece to be fed between opposed unit cases. A sheet-shaped workpiece passes through opposed side work-spaces by feed rollers at the front and rear of the workpiece. A drill hole for guiding a drill head is provided at an end portion of a bottom floor of the work space. A workpiece clamp is provided on the outer periphery of the drill hole, the clamp being arranged to be elevated from the workpiece. An imaging camera is located at a ceiling of the work-space to view a reference mark which has been printed on the workpiece in order to locate an accurate position for the drill head. A twist drill on the drill head is provided in opposition with the drill hole and is located in the lower portion of the unit case. A drive mechanism is provided to move the twist drill in the X-axis and Y-axis directions within the unit case.

According to a second embodiment of the invention, a sensor hole for guiding a sensor head is provided at a ceiling in the work-space in opposition with the drill hole. A C-shaped support member is arranged to surround the workspace within the unit case. A drive mechanism moves the C-shaped support member in the X-axis and Y-axis directions and a photo-sensor detects a reference mark which has been printed on the workpiece. The photo-sensor is located at the upper end portion of the C-shaped support member. A twist drill for piercing a basis hole at the marked position on the workpiece is located at the lower end portion of the C-shaped support member, and the photo-sensor and twist drill are arranged to be elevated together along the same axis through the drill hole.

According to a third embodiment of the invention, a female die is located at the end portion of a bottom floor of the work-space. A punch assembly is located at the ceiling of the work-space and is arranged to be elevated and lowered. A punch nose of the punch assembly opposes the female die A photo-sensor or camera is provided at an end portion of the ceiling of the work-space with a predetermined spacing between the punch assembly and the photo-sensor or camera. The photo-sensor or camera detects a reference mark which has been printed on the workpiece to locate the position of the hole to be pierced. A drive mechanism is arranged on the outside of the unit case to move the unit case in the X-axis and Y-axis directions.

According to a fourth embodiment of the invention, drive mechanisms are provided to move the twist drill in the X-axis and Y-axis directions. The drive mechanisms include a Y-axis drive mechanism which is pivoted in the longitudinal direction of a first support member. The Y-axis drive mechanism is capable of being oscillated in the unit case and is arranged to move the first support member in the Y-axis direction. A pulse motor with a cam is arranged in the case to drive the first support member in the Y-axis direction. A X-axis drive mechanism includes a second support member which slidably moves relative to one end of the first support member in the X-axis direction. The second support member is driven by a pulse motor and cam. The twist drill is capable of being elevated with the second support member.

Figure 2:
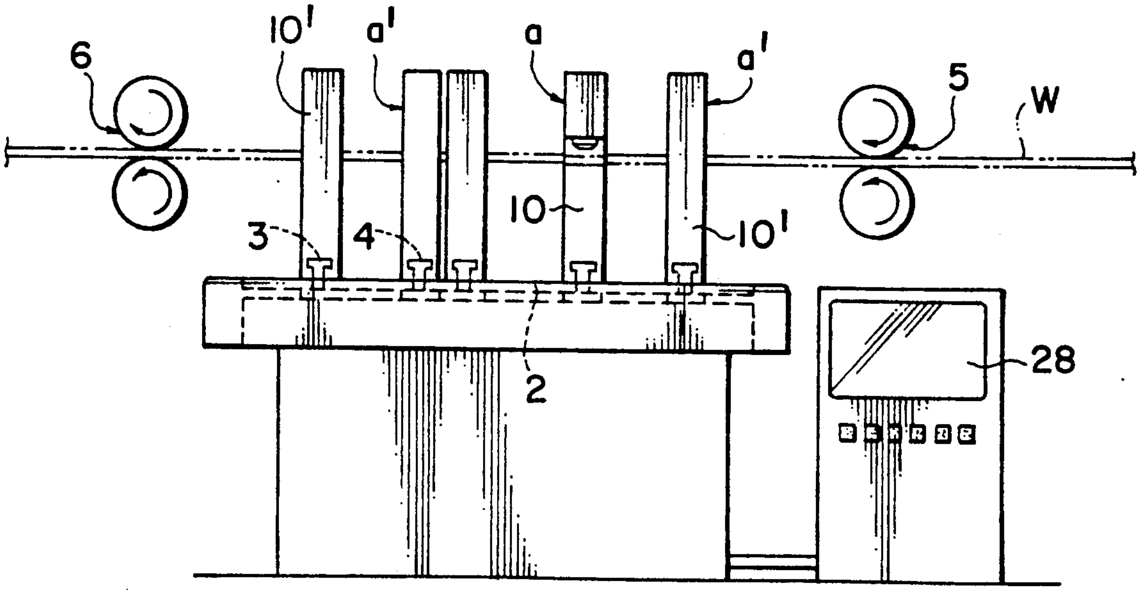
FIG. 2 is a side view of the apparatus of FIG. 1.
Figure 3:
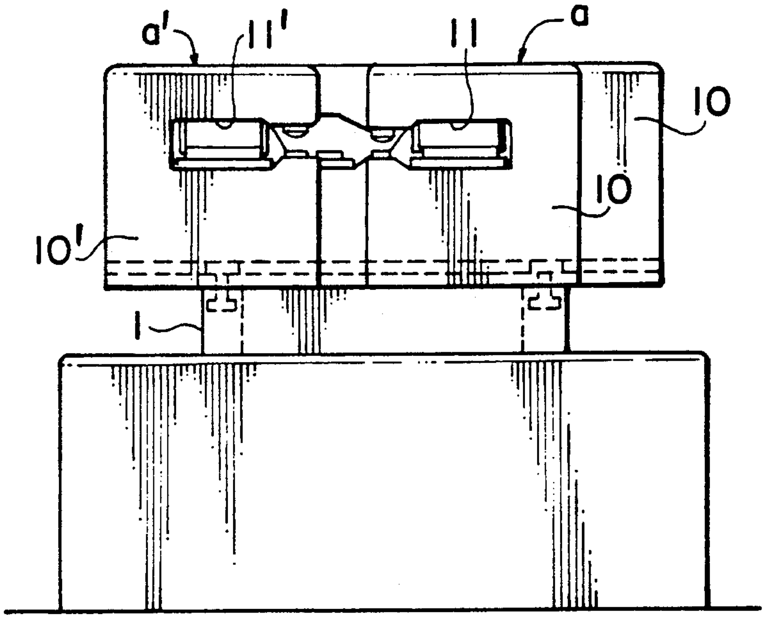
FIG. 3 is a rear elevation view of the apparatus of FIG. 1.

A first embodiment of the invention is shown in FIGS. 1-6. Referring particularly to FIGS. 1-3, machine bed 1 is provided in the conveying path of a workpiece which is conveyed in the direction of the arrow in FIG. 1. A plurality of piercing units a and a' are opposedly located on both sides of the machine bed along the conveying path.

Each piercing unit a, a' is enclosed in a respective unit case 10, 10' which includes flat vertical walls. C-shaped hollowed out work-spaces 11, 11' are formed in the upper portions of the respective unit case bodies. The open portions of the C-shaped work-spaces of opposed unit cases 10,10' face each other so that workpiece W spans and is conveyed through the opposed work-spaces.

Figure 4:
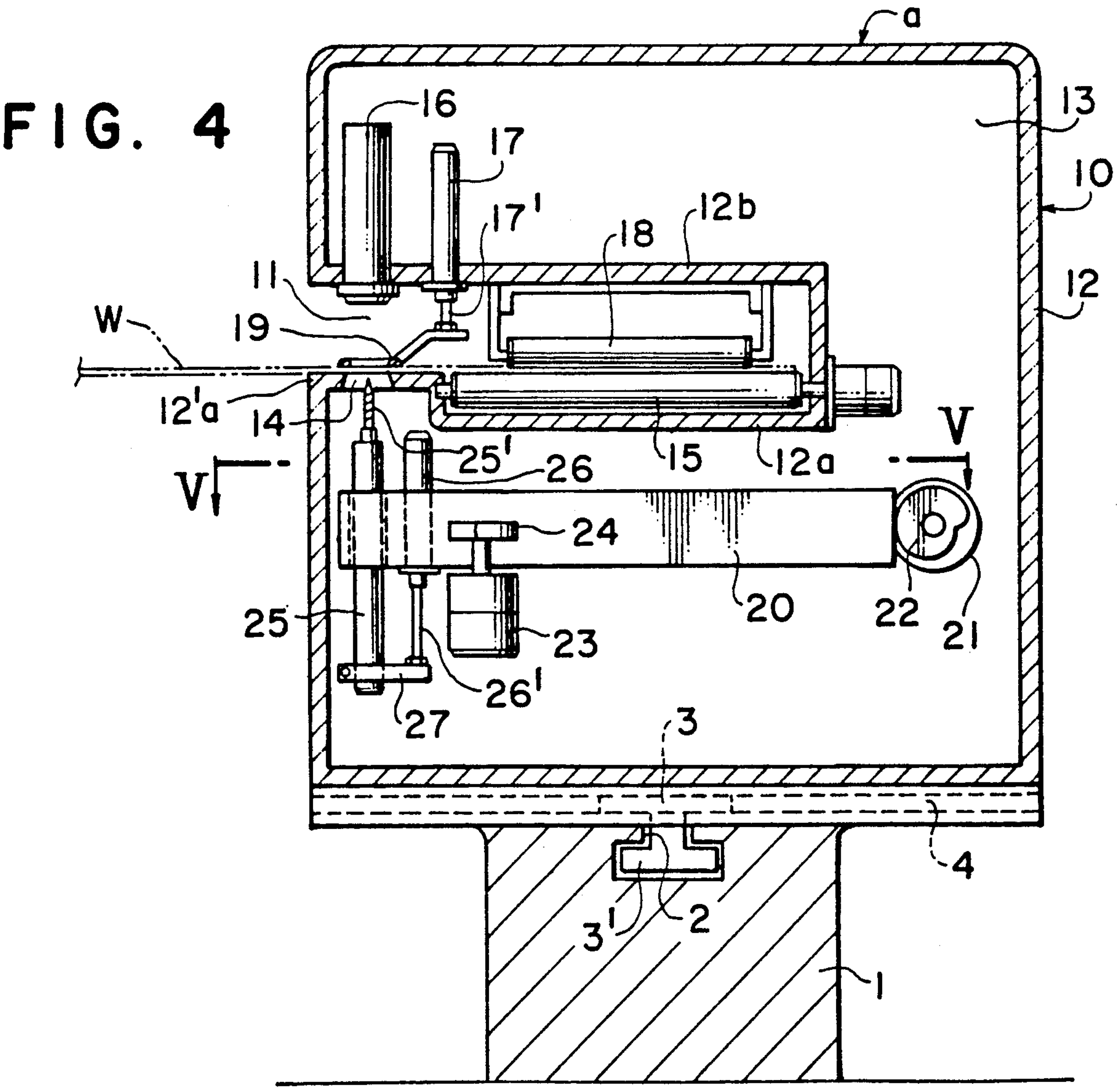
FIG. 4 is a section view showing a piercing unit of the apparatus of FIG. 1.

Units a,a' are adjustable in the X-axis and Y-axis directions. Guide grooves 2 are linearly located on the left and right sides of machine bed 1. A support base 3 is provided with an air clamp 3' and is slidably movable in guide grooves 2 (FIG. 4). Units a, a' are also movable with respect to support base 3 by sliding in groove 4 which is formed under the bottom surface of units a, a' (FIGS. 2 and 4). According to the above arrangement, units a, a' are movable along either the X-axis and Y-axis directions and then are fixed at a predetermined position by means of the air clamp 3'.

In the drawings, four units a, a' are provided on each side of machine bed 1, that is eight units a, a' are provided. Of course, any number of units may be provided. In FIG. 2, feed rollers 5, 6 are rotatably arranged to intermittently feed workpiece W by engaging the feed side and discharge side of workpiece W.

Only the structure of unit a is described in FIG. 4 since units a and a' are symmetrically formed with substantially identical construction except that they form mirror images of each other.

As can be seen in FIG. 4, unit case 10 includes side plates 13 that cover both sides of unit case body 12. Side plates 13 have a C-shaped sectional shape to include workspace 11 as shown in FIG. 4.

A bottom floor **12*a* or work-space 11 is provided in the unit case body 12. Working surface 12'a is also provided at the end of bottom floor 12*a*. A step is located between working surface 12'a and bottom floor 12*a*. Drill hole 14 is provided on working surface 12'a and feed roller 15 is arranged in parallel with bottom floor 12*a* of work-space 11 so as to be at substantially the same level as working surface 12'a**.

A small camera 16 is disposed through and under ceiling **12*b* of work-space 11 to view downwardly. Air cylinder 17 and guide roller 18 are also located under ceiling 12*b*. Camera 16 is substantially aligned with drill hole 14 of working surface 12'a. Air cylinder 17 includes work clamp 19 at the end of an actuating rod 17' so as to press around the outer periphery of drill hole 14. Guide roller 18 is arranged to contact feed roller 15** and act as an idler.

Figure 5:
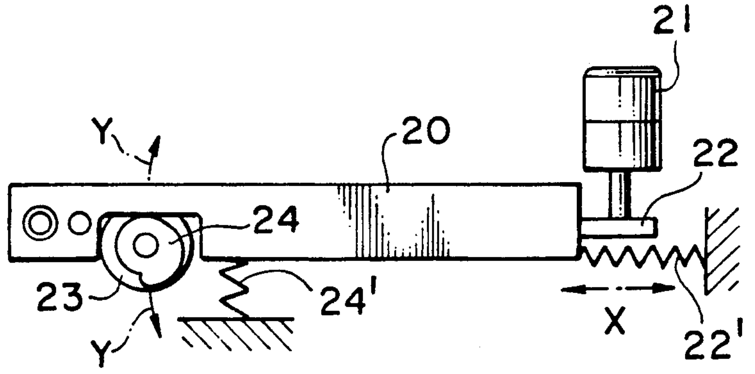
FIG. 5 is a section view taken along line V-V of FIG. 4.
Figure 6:
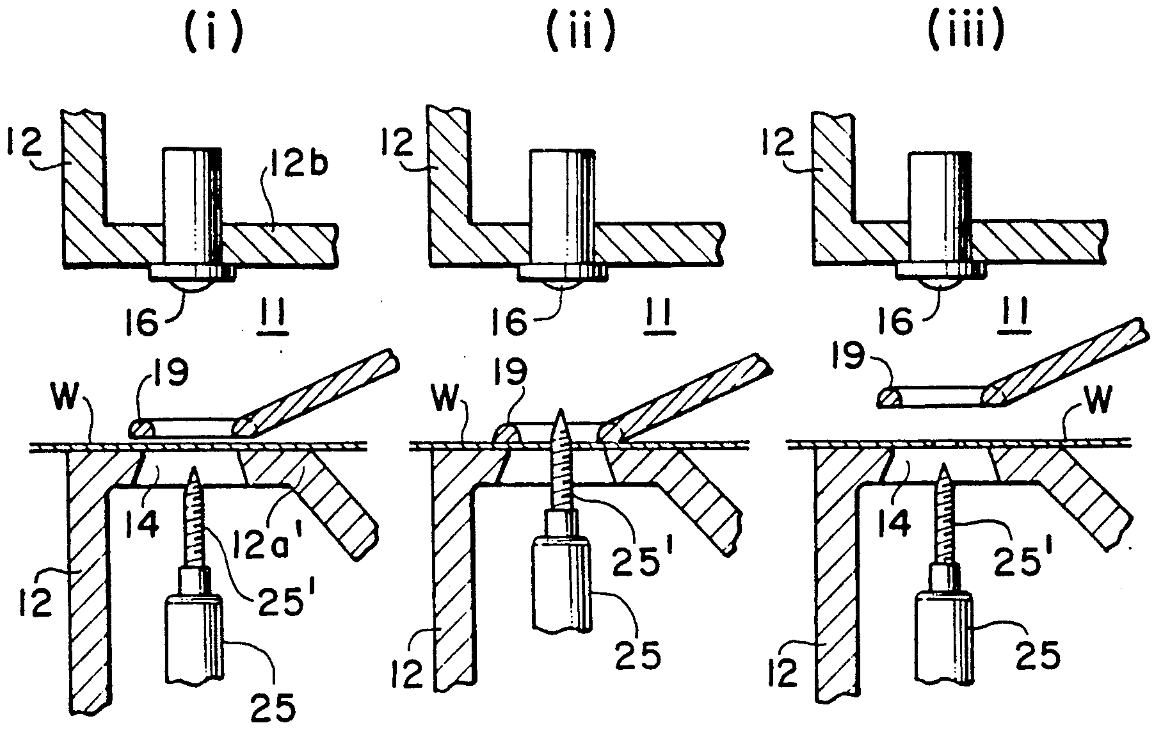
FIG. 6 (i) to (iii) are section views respectively showing the steps of piercing a workpiece in the embodiment of FIG. 1.

As seen in FIGS. 4 and 5, support member 20 is located in unit case body 12 under the bottom floor **12*a*. Support member 20 moves in the X-axis and Y-axis directions within a small range as shown by arrows X and Y, respectively, in FIG. 5. Support member 20 is driven by pulse motor 21 which includes eccentric cam 22 for moving support member 20 in the X-axis direction and another pulse motor 23 with eccentric cam 24 for moving the support member in the Y-axis direction. Biasing elements, such as springs 22', 24', bias support member 20 into contact with eccentric cams 22, 24**, respectively.

A twist drill 25 is associated with support member 20 and includes drill head 25' which points upwardly. Air cylinder 26 is arranged adjacent twist drill 25 and bracket 27 connects actuating rod 26' of air cylinder 26 with twist drill 25 so as to elevate the twist drill upon operation of air cylinder 26. Twist drill 25 is arranged so as to position drill head 25' at just under drill hole 14. Drill head 25' is rotated by a drive source such as an air turbine motor or the like which is housed within twist drill 25. Twist drill 25 is elevated by the operation of air cylinder 26 so that drill head 25' projects from drill hole 14 while it is rotating to pierce workpiece W.

According to the above described piercing apparatus, workpiece W is fed into the apparatus by operation of feed rollers 5, 6. The workpiece may be a raw material, such as a substrate or the like. A reference mark m is printed on the surface of workpiece W prior to the piercing process. Therefore, according to the relative position of each mark, the position of each unit a and a' on both of the machine bed sides is shifted along X-axis or Y-axis directions, respectively.

Workpiece W is intermittently fed and both of its side edges pass through and between both work-spaces 11, 11' of units a, a'. The bottom surface of workpiece W contacts working surface 12'a and feed roller 15.

As described above, the objects of the piercing apparatus are firstly to locate the accurate position of a basis hole on workpiece W according to a reference mark to enable it to be pierced by twist drill 25, and secondly, to locate the necessary basis holes so that other twist drills 25 of the other units a, a' may automatically pierce the workpiece.

Therefore, when the feeding of workpiece W has been intermittently stopped, each unit a, a' is shifted so that drill hole 14 is below the position of a respective reference mark m. Thereafter, each unit a, a' performs the locating process and piercing process according to a sequence controlled by a predetermined signal from a computer.

The locating process is performed when camera 16 of a controlled unit a has viewed a mark m below the camera. The image of mark m is processed by a well known device, such as an image data processing apparatus 28 or the like, and then the center coordinates (Xo—Yo) of mark m is measured.

According to the measured information of center coordinates (Xo—Yo) which has been processed, a pulse signal is output from the microprocessor into the pulse motors 21, 23 which move support member 20 along the X-axis and Y-axis directions so as to align drill head 25' with the center coordinate position of mark m (See FIG. 6(i)).

The piercing process is performed upon completion of locating process. The work clamp 19 descends to press a workpiece W against working surface 12'a by actuating air cylinder 17. Then, drill head 25' of twist drill 25 starts to rotate and is elevated for piercing workpiece W from below at the center position of mark m (See FIG. 6(ii)). After piercing, drill head 25' is lowered and work clamp 19 is elevated wherein the piercing process of controlled unit a has been completed (See FIG. 6(iii)).

After completion of the piercing process of the controlled unit, an instruction is shifted to the next unit and the same processes are repeated by the newly instructed unit while workpiece W remains stopped between the workspaces 11, 11'. In this way, the location and piercing processes are relayed to one unit after another, and when all the units have finished the piercing, the feed rollers 5, 6 are driven to discharge workpiece W and a new workpiece is fed into the work-spaces.

It is possible to modify the above-described process by starting the location process of a succeeding unit while the preceding unit is in the piercing process, and at the same time, upon the completion of the piercing process of the preceding unit, the succeeding unit may start the piercing process. According to this modification, working time may be saved. In addition, when a camera does not view any reference mark on a workpiece during the piercing process, the section of the workpiece without marks may be allowed to pass without any piercing work since no work is required, and it then proceeds to the next unit.

In another modification, it is possible that the feed roller 15 may be not always be required to drive the workpiece since it is contacted at its front and rear ends and fed by the main feed rollers 5, 6. That is, feed roller 15 may function as an idler. Moreover, it is possible to omit feed roller 15 and guide roller 18 if the bottom floor work-space 12*a* and the working surface 12'a are at the same level. It is also possible that feed roller 15 and guide roller 18 may be located at a side wall portion of the case body 10 and not at the upper position of the bottom floor of the work-space or it may be located separately from case body 10.

Figure 7:
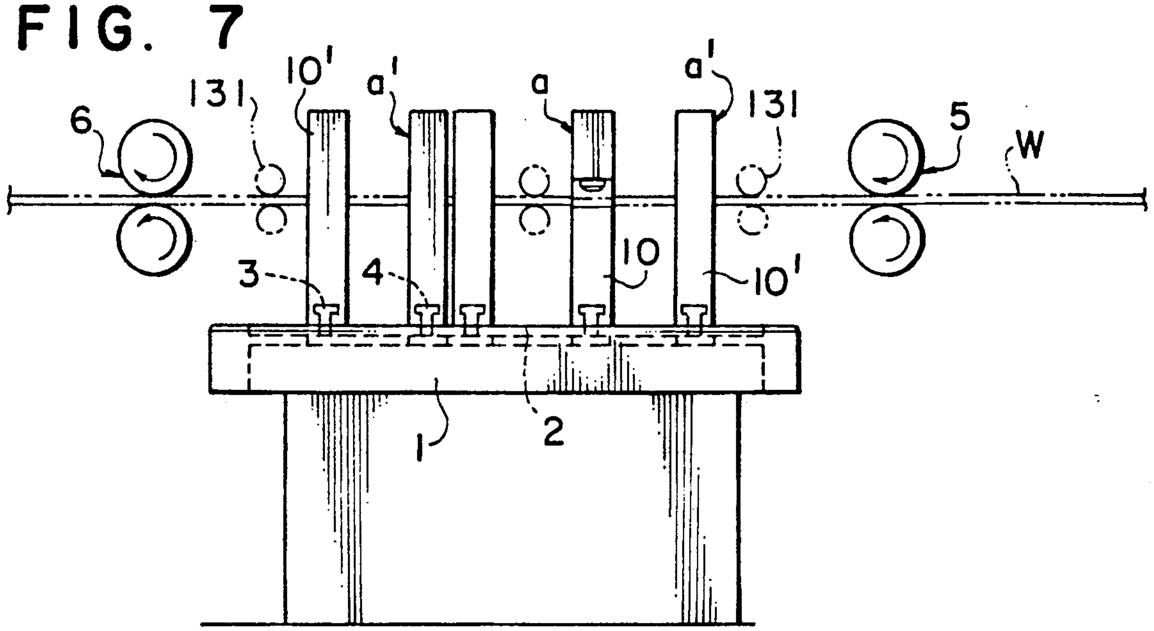
FIG. 7 is a side view of a second embodiment of a piercing apparatus of the present invention.
Figure 8:
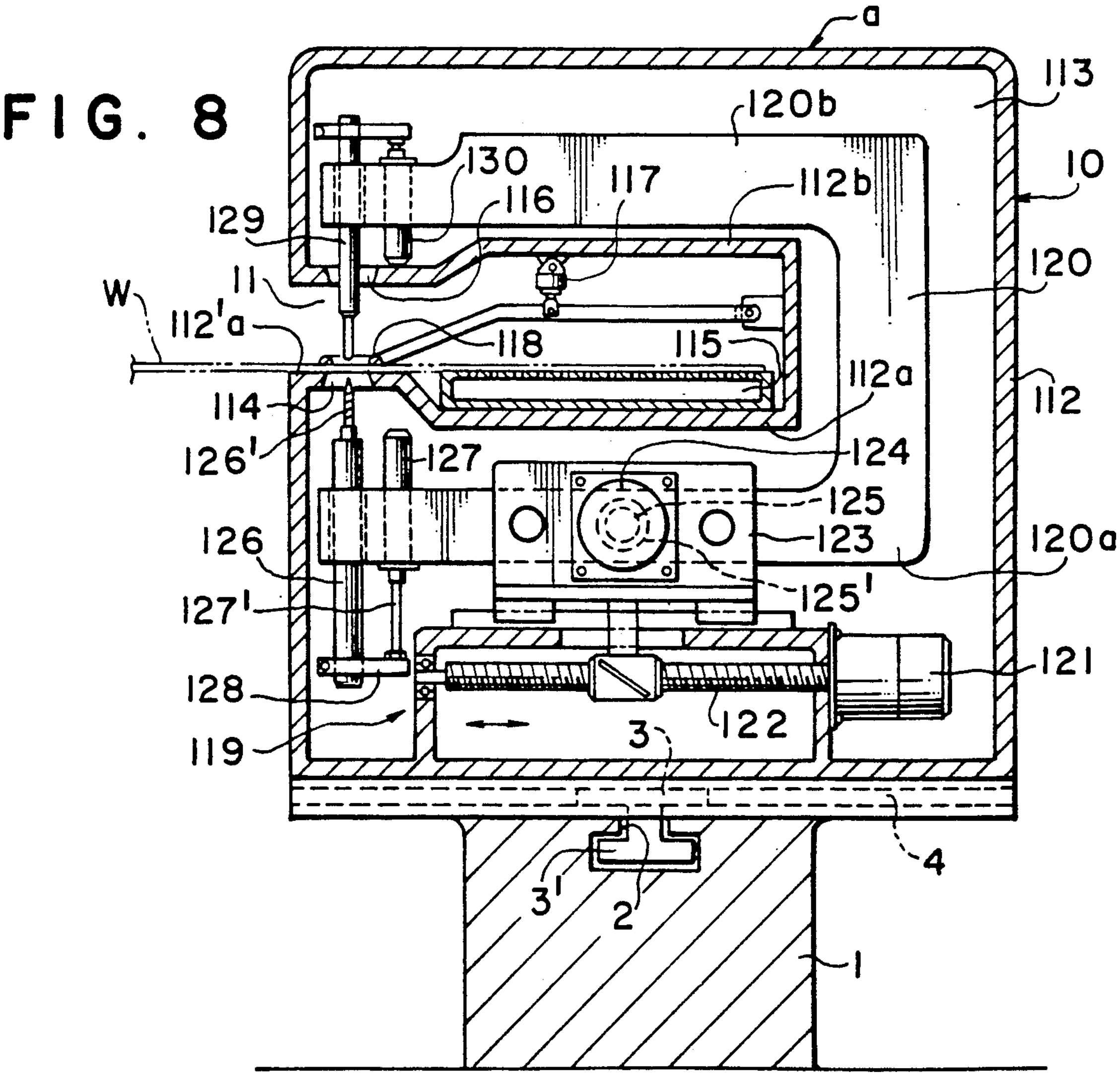
FIG. 8 is a section view showing a piercing unit of the apparatus of FIG. 7.
Figure 9:
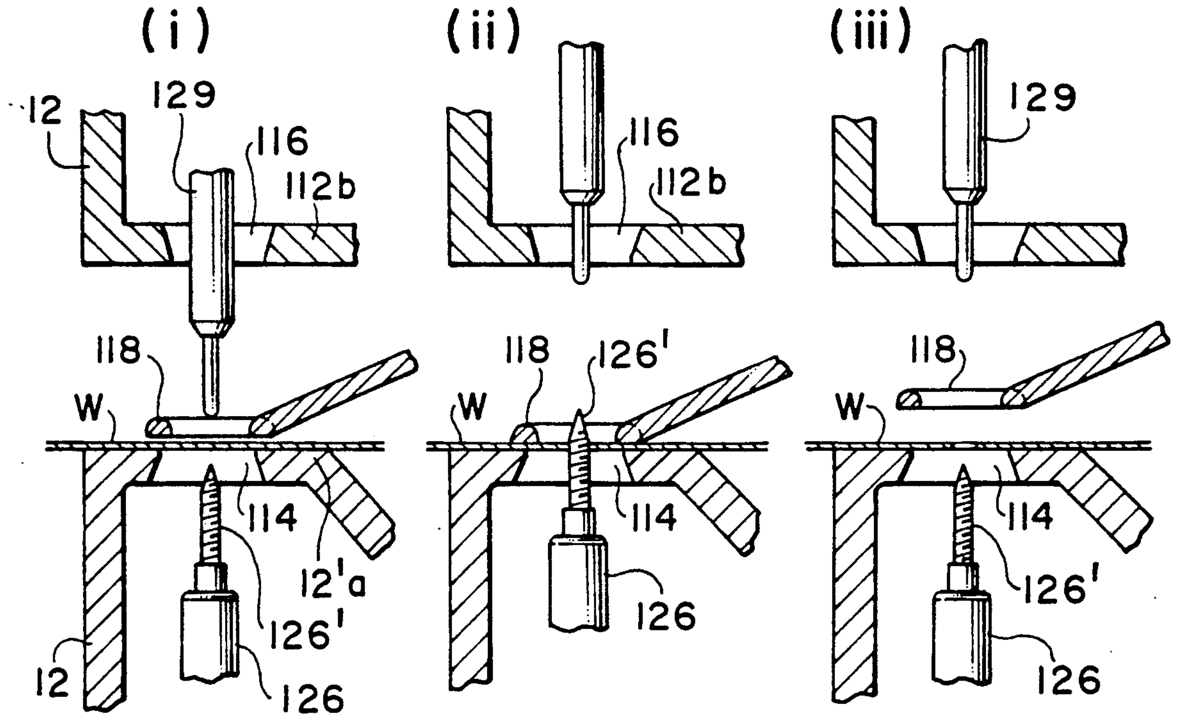
FIG. 9 (i) to (iii) are section views respectively showing the steps of piercing a workpiece in the embodiment of FIG. 7.

A second embodiment of the invention is shown in FIGS. 7–9. This embodiment is similar to the first embodiment in that it includes a plurality of units that are opposedly arranged on both sides of a machine bed as shown in FIGS. 1 and 2. The units are adjustably movable in the X-axis and Y-axis directions and include work-spaces with openings facing the openings in the units on the opposite side of the machine bed. Elements that are substantially the same as those in the first embodiment of FIGS. 1–6 are designated by the same reference numerals as the first embodiment.

Referring to FIGS. 7–9, the second embodiment includes a machine bed 1 and piercing units a, a'. Each piercing unit includes a case 10, 10' and work-space 11, 11'. The unit cases are adjustable in the X-axis and Y-axis directions in substantially same manner as in the first embodiment.

Only the structure of unit a is described with reference to FIG. 8 since units a and a' are symmetrically formed with substantially identical construction except that they are mirror images of each other.

In FIG. 8, unit case 10 includes side plates 113 which cover both sides of unit case body 12 and have a C-shaped sectional shape to surround work-space 11.

A bottom floor 112*a* of work-space is provided in unit case body 12 and defines one surface of work-space 11. Working surface 112'a is provided at the end of bottom floor 112*a*. A step is located between bottom floor 112*a* and working surface 112'a. Drill hole 114 is provided on working surface 112'a and pneumatic conveyer 115 is arranged along the bottom floor 112*a* so that working surface 112*a* and the upper level of pneumatic conveyer 115 are at substantially the same level.

Pneumatic conveyer 115 includes a flat shaped duct with a perforated floor on the upper surface of the duct to jet out a soft air stream from the perforations over the whole surface of the conveyor to allow the workpiece to float when it is conveyed. The air jet is stopped when the workpiece is stopped.

As an alternative , it is possible to substitute a soft brush floor on the bottom floor 112*a* for the perforated floor.

A sensor hole 116 is provided in the ceiling 112*b* of the work-space in opposition to drill hole 114. Air cylinder 117 is suspended from substantially the center portion of ceiling 112*b*. Workpiece clamp 118 is pivoted on a vertical wall of the work-space and is also pivotally connected with cylinder 117, so that clamp 118 presses on the outer periphery of drill hole 114 by operation of air cylinder 117.

C-shaped support member 120 is provided within the unit case body 12 so as to encircle work-space 11. C-shaped support member 120 is connected to drive mechanism 119 at its lower portion 120*a*. Drive mechanism 119 is arranged in the interior bottom of unit case body 12 and includes jackscrew 122 which is driven in the X-axis direction by a pulse motor 121. Movable bed 123 is supported by a shank which engages jackscrew 122. Another jackscrew 125 is driven in the Y-axis direction by pulse motor 124 which is located on movable bed 123. Jackscrew 125 cooperates with a threaded bore 125' which is bored crosswise into lower portion 120*a* of C-shaped support member 120.

Lower portion 120*a* of C-shaped support member 120 is horizontally arranged under the bottom floor of the workspace and twist drill 126 is located at the end portion of support member 120 and includes upwardly pointing drill head 126'. Twist drill 126 is elevated by air cylinder 127 which is fixed in parallel with twist drill 126 through bracket 128 which connects twist drill 126 and actuating rod 127' which extends from air cylinder 127.

Twist drill 126 is arranged so as to locate drill head 126' just under drill hole 114. Drill head 126' is rotated by a drive source such as an air turbine motor or the like which is housed in twist drill 126. Drill head 126' is elevated while it is rotated , and projects from drill hole 114 to pierce the workpiece from below.

The upper portion 120*b* of C-shaped support member 120 is horizontally arranged above the upper portion of ceiling 112*b* of work-space 11. A reflex type photo-sensor 129 is located at the upper portion 120*b* so as to be capable of being elevated by air cylinder 130.

The reflex type photo-sensor 129 passes through sensor hole 116 to be positioned at a predetermined clearance above the workpiece on working surface 112'a as shown in FIGS. 8 and 9(i)–9(iii). Photo-sensor 129 and drill head 126' are arranged so as to be aligned along substantially the same axis. Photo-sensor 129 is a well known type for locating the mark position in which it detects an edge of mark m while projecting an image of the mark with a light and reflecting the image to a projector according to the movements of C-shaped support member 120 along the X-axis and Y-axis directions. Upon the completion of location of the mark, photo-sensor 129 and consequently drill head 126' become positioned at the center of mark m.

According to the operation of the second embodiment of the present piercing apparatus, a workpiece is fed into the apparatus by feed rollers 5, 6. The workpiece may be a raw material, such as a substrate or the like, which has been printed with reference marks m on its surface. The positions of units a and a' are respectively determined and automatically moved along X-axis and Y-axis directions according to the marking pattern as described above. Workpiece W is fed between both work-spaces 11, 11' by feed rollers 5, 6 which contact the front and rear ends of the workpiece and move it with respect to units a, a'. The bottom surface of the workpiece contacts working surface 112'a and pneumatic conveyer 115 to intermittently convey the workpiece Each unit a, a' is moved so that a reference mark m is located just above drill hole 114 and just below the photosensor of each unit case, whereupon the intermittent feed of the workpiece is stopped. Then, each unit case performs its predetermined processes, such as locating and piercing, under predetermined instruction signals from and according to a sequence controlled by a microprocessor.

The locating process is performed when photo-sensor 129 of an instructed unit case detects and measures a reference mark situated just under the photo-sensor by means of well known detecting means. Its center coordinates (Xo—Yo) are detected according to the movement of C-shaped support member 120 which is driven by drive mechanism 119, wherein drill head 126' which is movable together with photo-sensor 129 is introduced at just under the center coordinates (FIG. 9(i)).

The piercing process is performed upon the completion of the location process. A workpiece is clamped between working surface 112'a by workpiece clamp 118 which is actuated by air cylinder 117. Photo-sensor 129 is lifted by air cylinder 130 and twist drill 126 is elevated while rotating drill head 126' to pierce the center portion of a mark from below (FIG. 9(ii)). Upon completion of the piercing process, twist drill 126 returns downwardly and workpiece clamp 118 returns upwardly to complete the piercing process (FIG. 9(iii)).

Next, another unit case is instructed to perform the same processes successively and when all the unit cases have completed the processes, the processed workpiece is intermittently forwarded a predetermined amount by feed rollers 5, 6, and the cycle is repeated when the workpiece is stopped.

The centering process of a subsequent unit may be allowed to start while an earlier one is in the piercing stage, and thereafter start its piercing process upon the completion of the earlier one's piercing process, thereby saving working time of the total processes. It is also possible to allow the workpiece W to go past a piercing unit when no reference marks have been detected in the locating process.

As described above, the feeding of workpiece W is performed by the feed rollers 5, 6. However, it is possible to arrange any number of feed rollers or any guide rollers 131 (FIG. 7) on machine bed 1 and it also possible to locate guide rollers at a side of each unit case.

Figure 12:
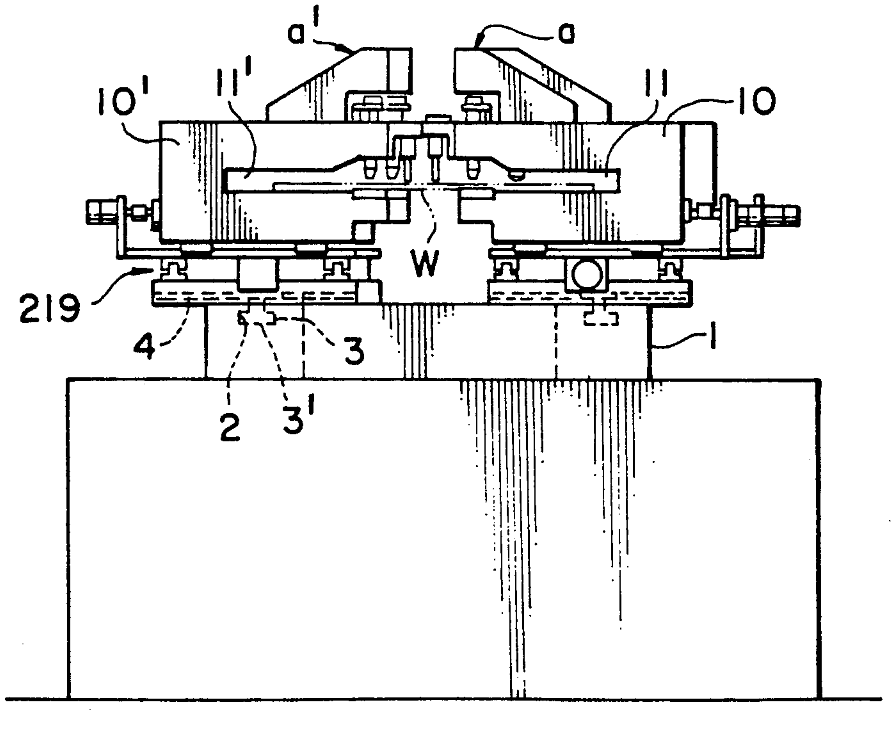
FIG. 12 is a rear elevation view of the apparatus of FIG. 10.
Figure 10:
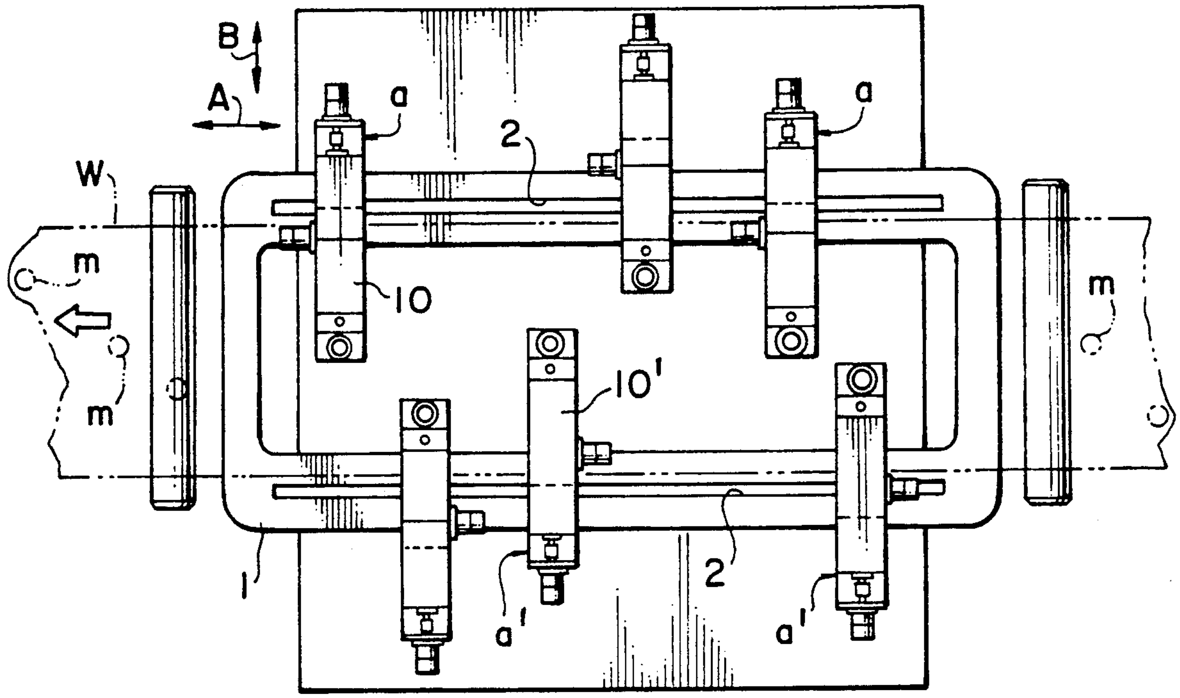
FIG. 10 is a plan view showing a third embodiment of an apparatus of the present invention.
Figure 11:
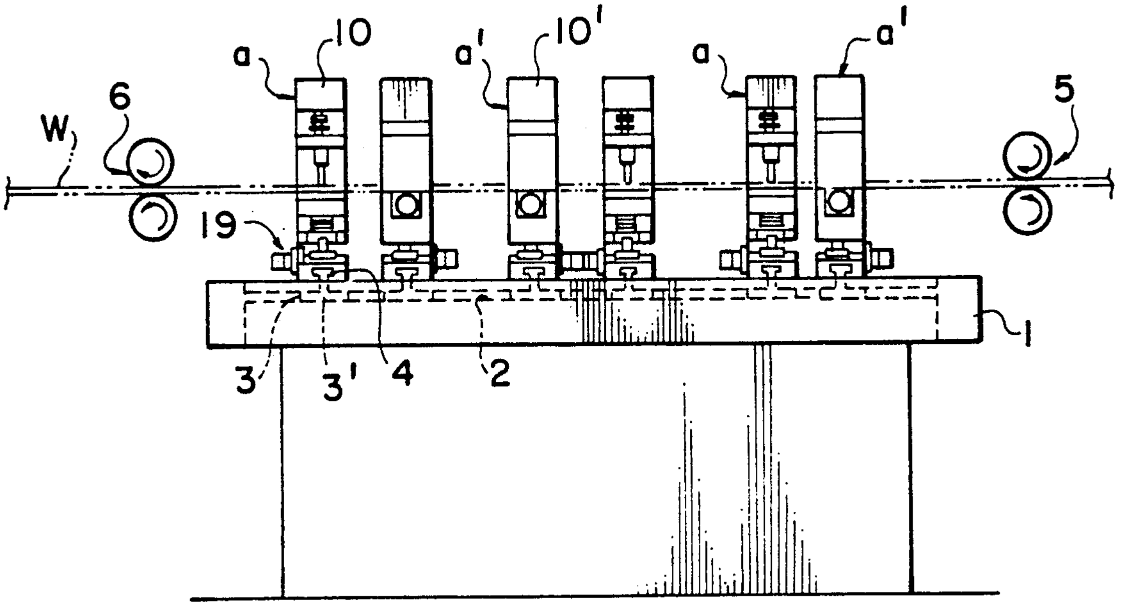
FIG. 11 is a side view of the apparatus of FIG. 10.

A third embodiment of the invention is shown in FIGS. 10–15. This embodiment is similar to the first and second embodiment in that it includes a plurality of piercing units that are opposedly arranged on both sides of a machine bed as shown in FIGS. 10 - 12. The units are adjustably movable in the X-axis and Y-axis directions and include work-spaces with openings facing the openings in the units on the opposite side of the machine bed. Elements that are substantially the same as those in the first two embodiments are designated by the same reference numerals as in the first and second embodiments.

Referring to FIGS. 10–13, the third embodiment includes a machine bed 1 and piercing units a, a'. Each piercing unit includes a case 10, 10' and work-space 11, 11'. The unit cases are adjustable in the X-axis and Y-axis direction in the same manner as in the first and second embodiment.

Only the structure of unit a is described with reference to FIG. 13 since units a and a' are symmetrically formed with substantially identical construction except that they are mirror images of each other.

Figure 13:
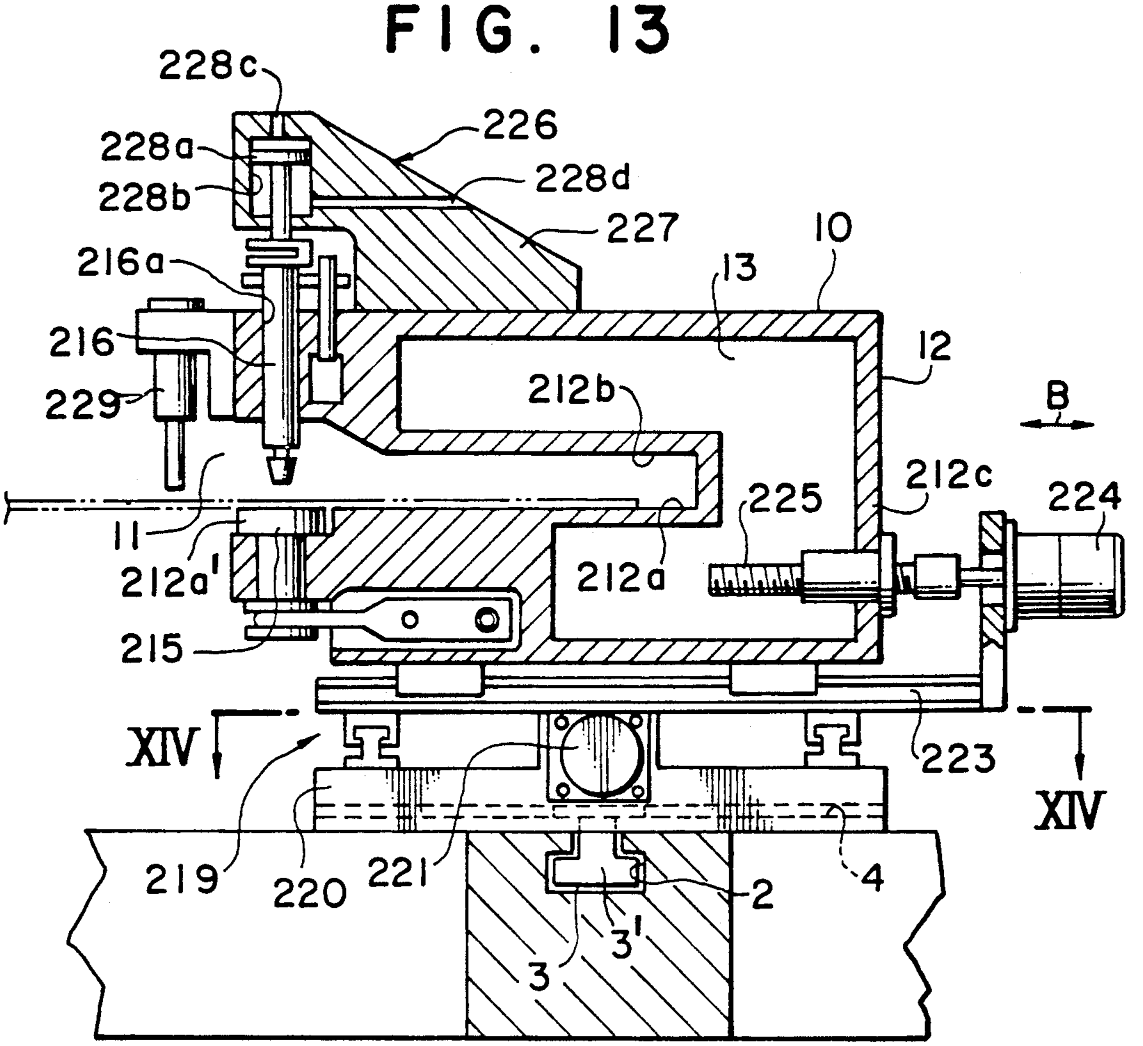
FIG. 13 is a section view showing a piercing unit of the apparatus of FIG. 10.
Figure 14:
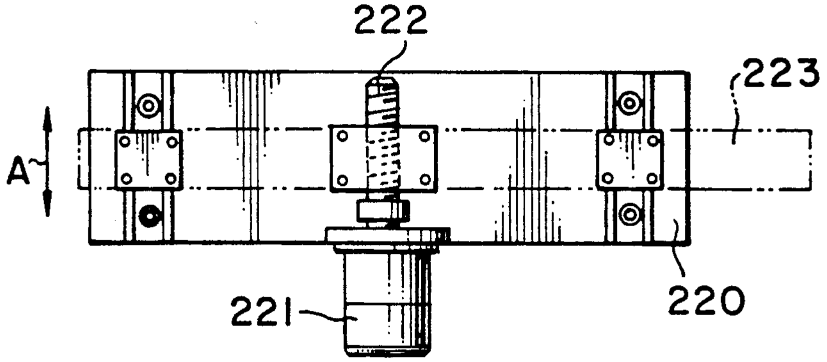
FIG. 14 is a section view taken along line XIV-XIV in FIG. 13.

In FIG. 13, a unit case 10 includes side plates 13 to cover both sides of unit case body 12 which has a C-shaped sectional shape defining work-space 11.

Drive mechanism 219 includes base 220, the sliding groove 4 being formed under the bottom surface of base 220, pulse motor 221 which engages jackscrew 222, Y-axis jackscrew 225 which engages side wall 212*c* of unit case body 12, and pulse motor 224 which is fixed to movable rail 223 for rotating the Y-axis jackscrew 225.

Drive mechanism 219 drives movable rail 223 along the X-axis direction within a small range (the range being shown by arrow A) which is driven by pulse motor 221, so that unit case body 12 on movable rail 223 is movable along X-axis direction. Unit case body 12 is also movable along the rail in the Y-axis direction within a small range (shown by an arrow B in FIGS. 10-13) by the rotation of Y-axis jackscrew 225 driven by pulse motor 224.

In FIG. 13, a down step section 212a' is provided at the end portion of bottom floor 212*a* which defines workspace 11. Female die 215 is fixed to step section 212a' to be at the same level as bottom floor 212*a*.

A longitudinal bore 216*a* is bored in the ceiling 212*b* of work-space 11 for slidably receiving punch assembly 216 therein to oppose and be substantially aligned with a slug hole (not shown) of female die 215. A reciprocating mechanism 226 and photo-sensor 229 for locating a reference mark m are arranged with the unit case body 12.

Reciprocating mechanism 226 includes housing 227, reciprocating piston 228*a* connected with the punch assembly 216 within housing 226, cylinder 228*b* to receive the piston 228*a*, and a compressed air charging passage 228*c* and air discharging passage 228*d* communicating with cylinder 228*b*, wherein punch assembly 216 reciprocates with a predetermined stroke in response to compressed air within cylinder 228*b* to pierce a workpiece.

Photo-sensor 229 is arranged at the end portion of ceiling 212*b* at a predetermined distance from punch assembly 216. Photo-sensor 229 is a well known type device for locating the mark position wherein it detects an edge of mark m while continuing to project an image with a light and to reflect the image onto a projector in response to movements of case body 12 along the X-axis and Y-axis directions. When the mark is located, photo-sensor 229 and punch assembly 216 are positioned at the center of mark m.

According to the operation of the third embodiment of the present piercing apparatus, a workpiece is fed into the apparatus by feed rollers 5, 6, as described above. The workpiece may be a raw material, such as a substrate or the like, which has been printed with reference marks m in a predetermined pattern. The positions of units a and a' are automatically determined respectively according to the arrangement of the marking pattern on the workpiece and are moved along the X-axis and Y-axis directions accordingly.

Workpiece W is intermittently fed between both work spaces 11, 11' and contacts the upper surface of female die 215 and the bottom floor 212*a* of the workspace.

Each unit a, a' is moved so that a reference mark m is just under photo-sensor 229 of each unit when the workpiece is stopped during the intermittent feeding whereupon each unit respectively performs its predetermined processes, such as the locating and piercing processes, under predetermined instruction signals from and according to a sequence controlled by a microprocessor.

Figure 15I:
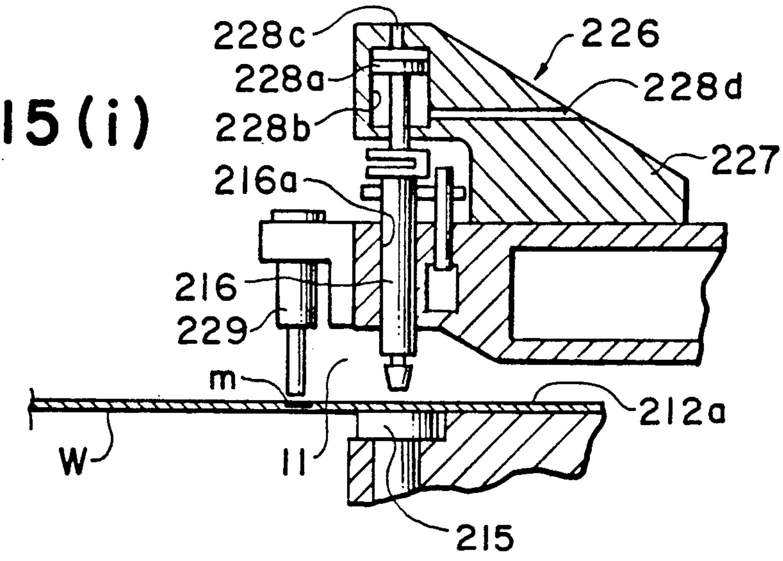
FIGS. 15 (i)–15 (iii) are section views respectively showing the steps of piercing a workpiece in the embodiment of FIG. 10.
Figure 15:
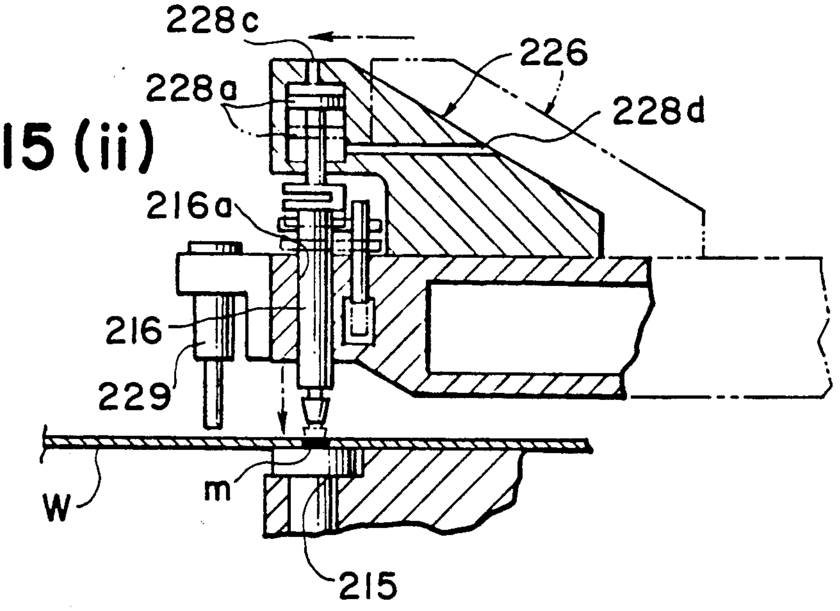

The locating process is performed when the photosensor 229 of the instructed unit detects and measures the reference mark m located just under photo-sensor 229 by means of well known detecting means. Its center coordinates (Xo—Yo) are detected according to the movement of case body 12 which is driven by drive mechanism 219 (FIG. 15(i)) wherein case body 12 is slightly moved according to the distance between punch assembly 216 and photo-sensor 229 by means of pulse motor 224 upon the detection of reference mark m to pierce the workpiece by actuation of cylinder 228*a* (FIG. 15(ii)-(iii)).

Next, another unit is instructed to successively perform the same two processes as the prior unit and when all units have completed the piercing operation, the processed workpiece is intermittently forwarded a predetermined amount by feed rollers 5, 6, and the cycle is repeated when the workpiece is stopped.

In the above-described process, it is possible to allow the locating process of a subsequent unit to start while a prior unit is in the piercing stage, and to further start the piercing process of another unit upon the completion of the piercing process of the prior unit, thereby saving working time of the total processes. It also may be possible to let the workpiece go past the units when no marks have been detected during the locating process.

As described above, the reference mark is detected by photo-sensor 229. However, it is possible to substitute a small camera for the photo-sensor, wherein the camera detects the reference mark m which is located just under the camera and then measures the center coordinates (Xo—Yo) of the mark according to a well known image data processing means.

A fourth embodiment of the invention is shown in FIGS. 16-23. This embodiment is also similar to the three embodiments described above in that it includes a plurality of piercing units that are opposedly arranged on both sides of a machine bed as shown FIGS. 16-18. The units are also adjustably movable in the X-axis and Y-axis directions and include work-spaces with openings facing the openings in the units on the opposite side of the machine bed. Elements that are substantially the same as those in the first two embodiments are designated by the same reference numerals as in the first, second, and third embodiments.

Figure 16:
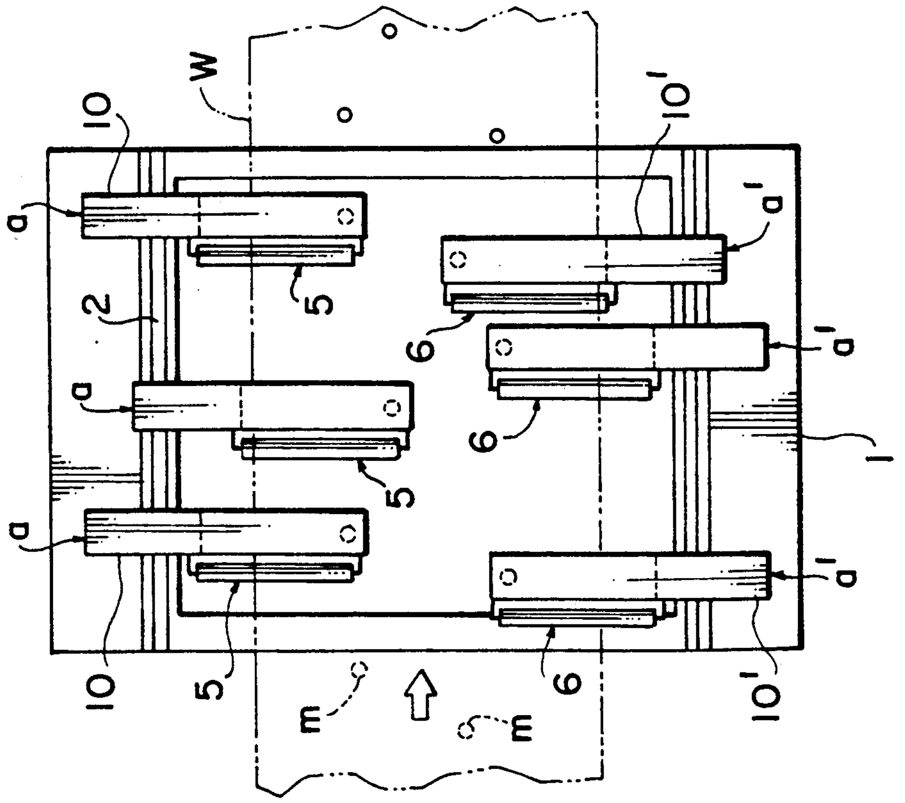
FIG. 16 is a plan view showing a fourth embodiment of an apparatus of the present invention.
Figure 17:
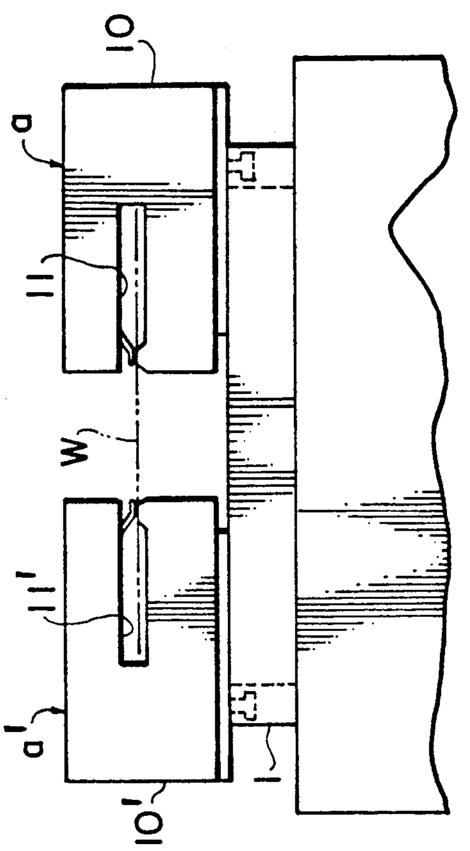
FIG. 17 is a rear view of the apparatus of FIG. 16.
Figure 18:
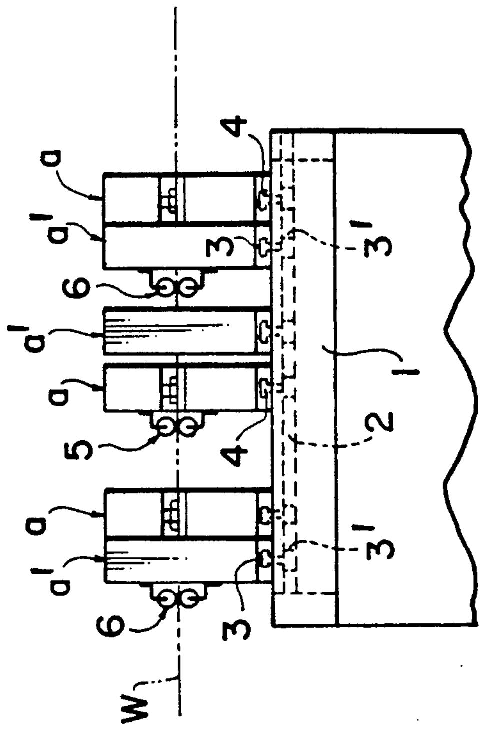
FIG. 18 is a side view of the apparatus of FIG. 16.

Referring to FIGS. 16-18, the fourth embodiment includes a machine bed 1 and piercing units a, a'. Each piercing unit includes a case 10, 10' and work spaces 11, 11'. The unit cases are adjustable in the X-axis and Y-axis directions in substantially the same manner as in the previously described embodiments.

Only the structure of unit a is described with particular reference to FIGS. 19-23 since units a and a' are symmetrically formed with substantially identical construction except that they are mirror images of each other.

As can be seen in FIGS. 16-18, three units a, a' are provided on each side of machine bed 1 for a total of six units. Of course, any number of units may be provided. Feed rollers or guide rollers 5, 6 are arranged to be intermittently rotatable.

Figure 19:
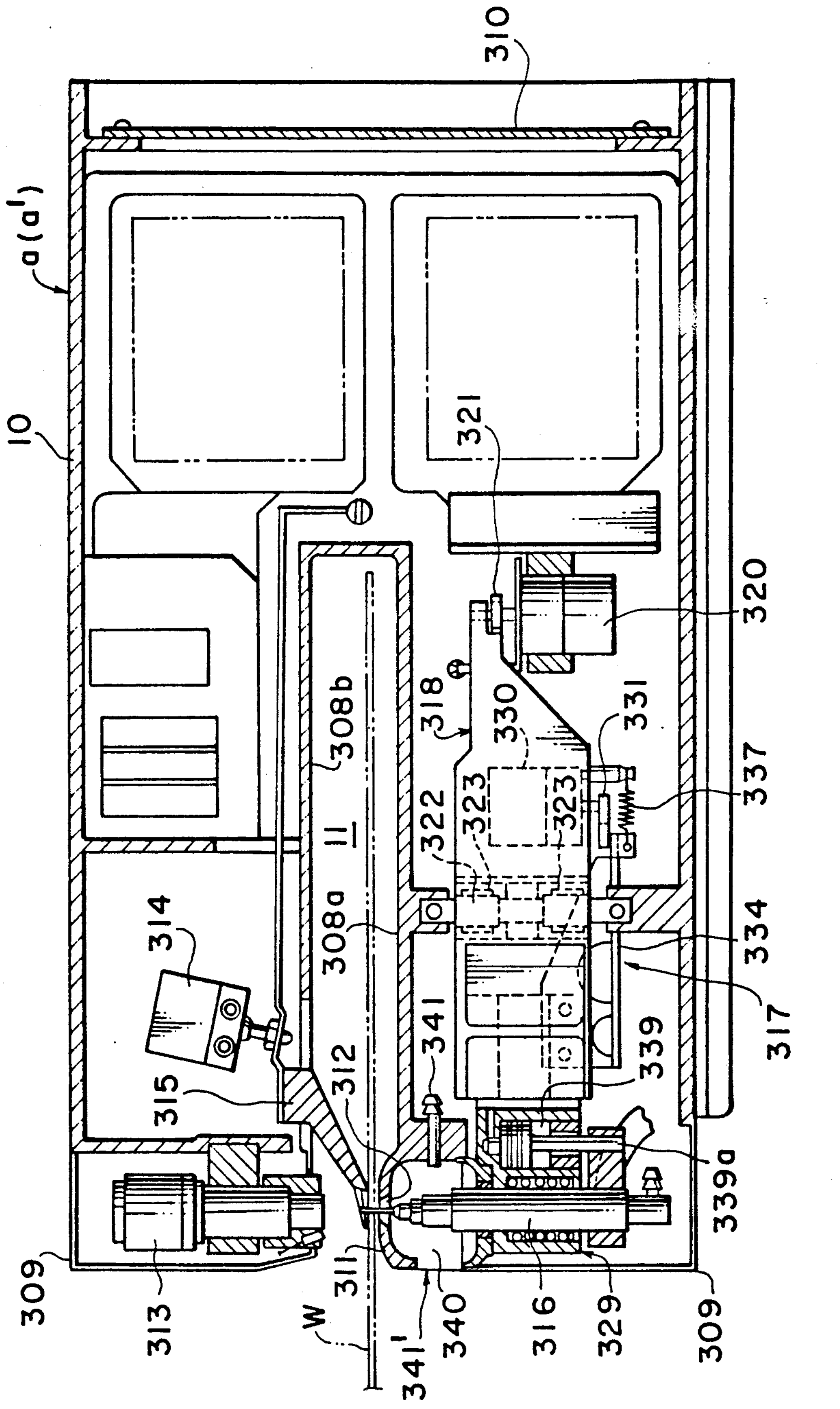
FIG. 19 is a sectional side view of the apparatus of FIG. 16 showing a workpiece being pierced.
Figure 20:
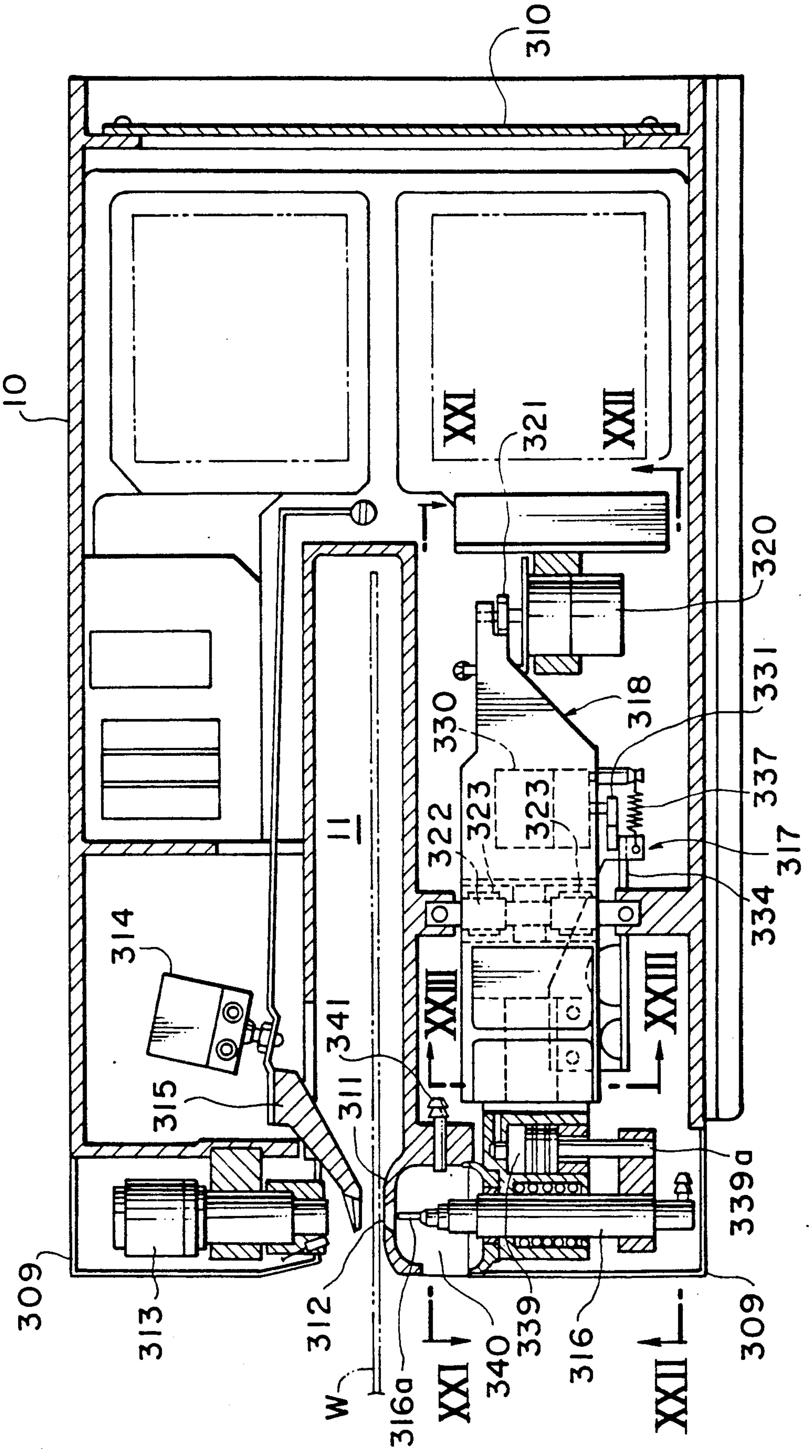
FIG. 20 is a sectional side view of the apparatus of FIG. 16 showing the clamp raised and the drill lowered.

As seen in FIGS. 17, 19 and 20, unit a includes case 10, having C-shaped hollowed out work-space 11, and plates 309, 310 to cover the sides of case 10. C-shaped hollowed out work-space 11 further includes bottom floor 308*a* and ceiling 308*b*. Bottom floor 308*b* includes working surface 311 which is located at an end portion of bottom floor 308*a* and includes drill hole 312.

A small camera 313 and air cylinder 314 are arranged in ceiling 308*b* of work-space 11. Camera 313 is substantially vertically disposed in the upper half portion of case 10 in opposed relation to drill hole 312. Air cylinder 314 and work clamp 315 are also disposed in the upper half portion of case 10. Work clamp 315 is connected to the rod end of air cylinder 314 to detachably contact the peripheral surface of drill hole 312 (See FIG. 19).

Twist drill 316 is arranged in the lower portion of case 10 to elevate through drill hole 312 from below, and drive mechanism 317 is arranged in the lower portion of case 10 to move twist drill 316 along the X-axis direction (arrow X in FIG. 22) and Y-direction (arrow Y in FIG. 21).

Camera 313 detects a reference mark m which has been printed on the workpiece and sends its image data to a microprocessor (not shown), which is a well known device for processing image data detected by a camera and then outputs an electric signal to drive a drive mechanism so as to locate center coordinates (Xo—Yo) to be processed in the microprocessor, wherein the position of twist drill 316 is moved within a small range by drive mechanism 317 while being guided along the X-axis and Y-axis directions through the control of the microprocessor to be located at the center coordinates (Xo—Yo). Drive mechanism 317 further includes X-axis drive mechanism 317*a* and Y-axis drive mechanism 317*b*.

Figure 21:
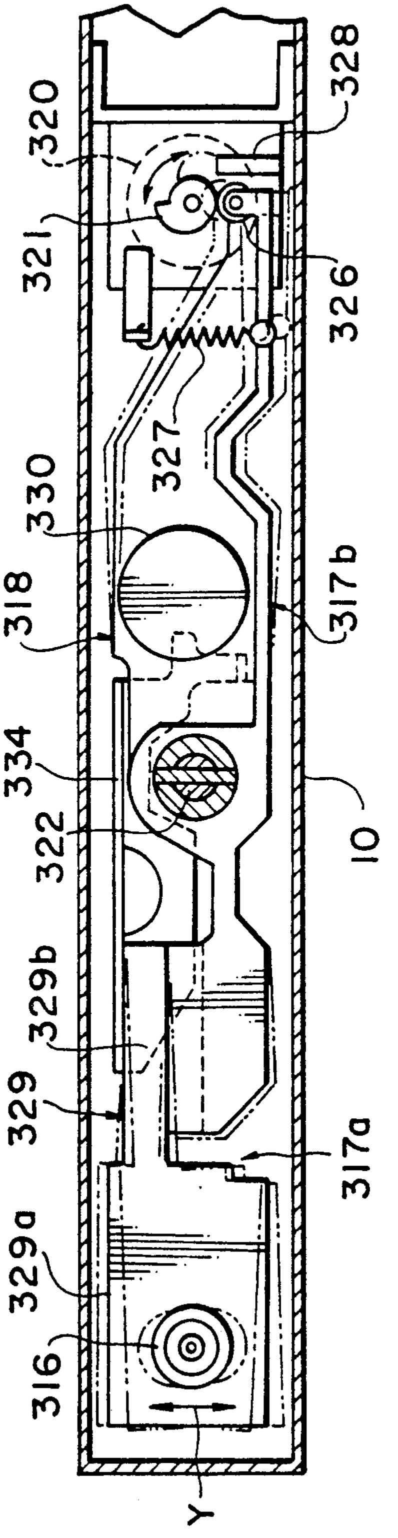
FIG. 21 is a sectional view taken along line XXI—XXI in FIG. 20.
Figure 22:
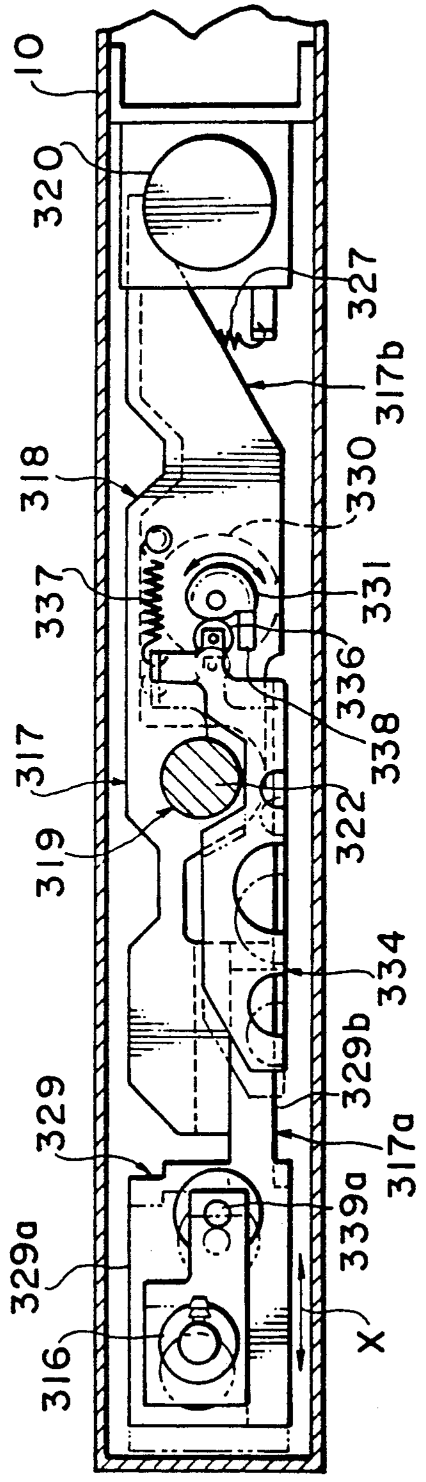
FIG. 22 is a sectional view taken along line XXII—XXII in FIG. 20.
Figure 23:
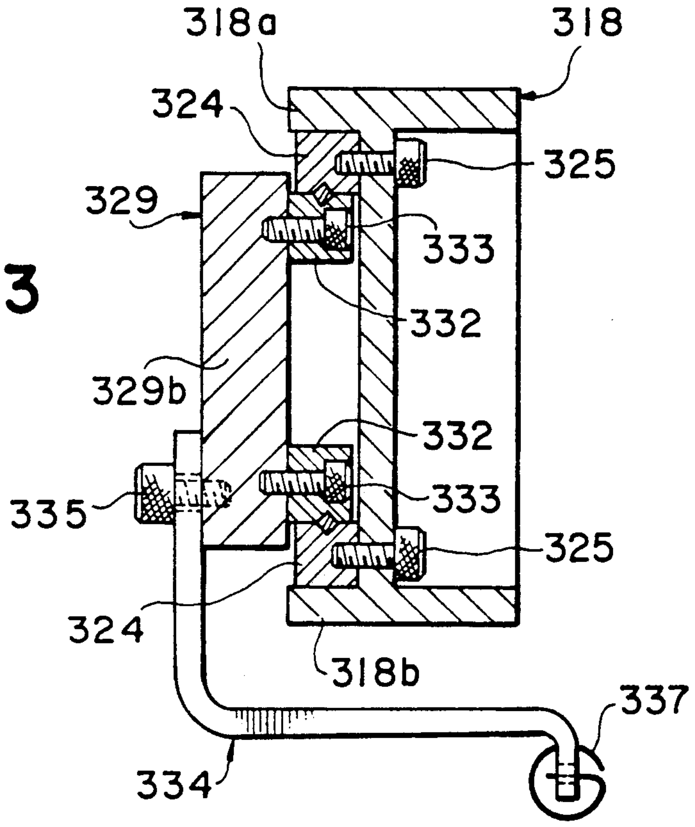
FIG. 23 is a sectional view taken along line XXIII—XXIII in FIG. 20.
Figure 24:
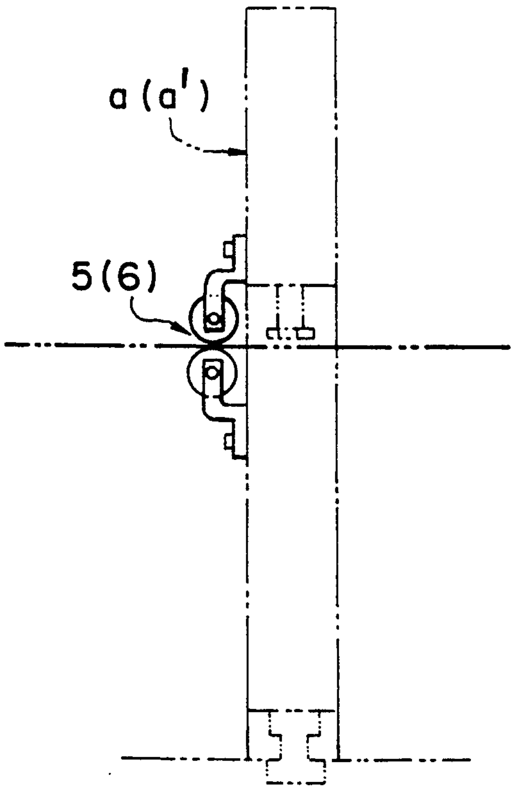
FIG. 24 is a side view of the embodiment of FIG. 16 showing the feed and guide rollers.

As seen in FIGS. 20–22, Y-axis drive mechanism 317*b* includes support member 318, pivotal section 319, pulse motor 320 and eccentric cam 321. The support member 318 is formed as a longitudinal member which is pivoted by the pivotal section 319 at substantially its center portion wherein the left portion of support member 318 is arranged to be oscillated in the Y-axis direction (as shown by an arrow Y in FIG. 21). Pivotal section 319 is pivoted by means of eccentric cam 321 which is driven by pulse motor 320. More particularly, support member 318 has two sectional shapes, that is, a substantially H-shape section which is the end which is to be oscillated (as shown in FIG. 23) and a substantially L-shape section which is the other end which is the side driven by eccentric cam 321. A support shaft 322 of pivotal portion 319 is vertically arranged in case 10 with axle-bearings 323, which may be linear type ball bearings.

Guide members 324 are metallic members having lubrication properties and are arranged to be fixed by bolts 325 with upper corners adjacent upper plate 318*a* and also to lower corners adjacent lower plate 318*b* of H-shaped support member 318. Idle roller 326 is disposed at the end portion of the L-shaped support member for contacting eccentric cam 321.

As seen in FIG. 21, coil spring 327 is disposed between the other end of support member 318 and a housing of pulse motor 320 to bias idle roller 326 towards the outer periphery of eccentric cam 321. It is preferable that the spring tension be sufficient so that spring 327 not only biases idle roller 326 towards eccentric cam 321 but also sufficiently biases the idle roller 320 so that it always contacts eccentric cam 321 even under possible oscillations generated when twist drill 316 is piercing the workpiece. As seen in FIG. 21, stopper 328 prevents overrun of eccentric cam 321.

X-axis direction drive mechanism 317*a* includes support member 329, pulse motor 330 and eccentric cam 331. Support member 329 is fixedly connected to the movable end of support member 318 so as to be movable forward and backward along the X-axis direction by means of eccentric cam 331 which is driven by pulse motor 330.

Support member 329 includes head section 329*a* to which twist drill 316 is connected so as to be capable of elevating. Slidable supporting member 329*b* projects from head section 329*a* and is slidably inserted between guide members 324 of support member 318 by means of counter guide members 332 which are fixed to the inside of slidably supporting member 329*b* by bolts 333 (See FIG. 23).

Twist drill 316 is vertically disposed at head section 329*a* and an extending bracket 334 which is detachably fixed to slidably supporting member 329*b* by bolt 335 (See FIG. 23).

Bracket 334 is adapted to move support member 329 along the X-axis direction through idle roller 336 which is driven by eccentric cam 331. Idle roller 336 is located at the end of extending bracket 334, and coil spring 337 is disposed between the end of extending bracket 334 and a portion of support member 318 for biasing idle roller 336 towards eccentric cam 331 (See FIG. 22).

Pulse motor 330 is disposed in relation with support member 318 so that its eccentric cam 331 contacts idle roller 36. As seen in FIG. 22, stopper 338 prevents the overrun of eccentric cam 331.

Twist drill 316 is vertically arranged at just under drill hole 312 and drill head 316*a* is located so as to point upwardly towards drill hole 312. Twist drill 316 is also arranged with head section 329*a* of support member 329 which is also the X-axis drive mechanism 317*a*. Twist drill 316 is driven by a power source such as an air motor.

Air cylinder 339 includes an actuating rod 339*a* connected with twist drill 316 so as to elevate the twist drill. When twist drill 316 is elevated, its drill head 316*a* pierces the workpiece from the bottom. As seen in FIGS. 19 and 20, a slug hole 340 is provided just under drill hole 312 and an air jet nozzle 341 is provided at the rear wall of an exhaust portion of slug hole 340 for discharging a drill slug which has fallen into the exhaust portion to the outside through a discharging port 341'.

According to the operation of the present piercing apparatus, a workpiece W is fed into the apparatus by feed rollers 5, 6, as described above. The workpiece may a raw material, such as a substrate or the like, and is printed with a reference mark m on its surface according to a predetermined marking pattern. The positions of units a, a' are respectively determined and moved automatically along the X-axis and Y-axis directions.

Camera 313 views the reference mark and stops the feed of the workpiece. The image data from camera 313 is processed by a well known image data processing apparatus which measures the center coordinate (Xo—Yo) of the reference mark, whereupon signals are dispatched from the processing apparatus to pulse motor 330 of X-axis drive mechanism 317*a* and also to pulse motor 320 of Y-axis drive mechanism 317*b* so that support member 329 is moved along the X-axis direction by means of eccentric cams 321, 331 which are driven by both motors 320, 330.

According to the movements of each support member, drill head 316*a* of twist drill 316 is guided to be located at the center coordinates of reference mark m.

Upon the completion of this locating process, air cylinder 314 lowers workpiece clamp 315 to clamp the workpiece to working surface 311. Twist drill 316 is elevated while drill head 316*a* is rotating so that the center of reference mark m is pierced by drill head 316*a*. During this piercing process, air is jetted from the air jet nozzle 341 to blow out any drill slug which has fallen from the drill head 316 to the outside through discharging port 341'.

Upon completion of the piercing process, another unit is instructed to successively perform the same processes as performed by the earlier unit. When all the units have completed the piercing, the processed workpiece is intermittently forwarded a predetermined amount by feed rollers 5, 6, and the cycle is repeated.

As described above, the present invention provides a piercing apparatus and method in which piercing units are located according to signals output from an image data processing apparatus, in response to input images from a camera or sensor while a workpiece is stopped. A locating process of a twist drill or punch at a reference mark is performed by movement along the Y-axis direction driven by a Y-axis drive mechanism and along the X-axis direction driven by an X-axis drive mechanism. The workpiece is pierced by the elevation of a twist drill or the lowering of a punch. Therefore, it is possible to incorporate the present device into a conveyer type manufacturing line, whereby it can improve the productivity of piercing the workpiece, even when the workpiece is a continuous sheet.

Although the invention has been described with reference to particular means, materials and embodiments, it is to be understood that the invention is not limited to the particulars disclosed and extends to all equivalents within the scope of the claims.

What is claimed is:

1. A multiple piercing apparatus for piercing a workpiece having reference marks defining the locations on the workpiece to be pierced, said workpiece being conveyed along a conveying path, said multiple piercing apparatus comprising:

(a) a machine bed located along the conveying path of the workpiece;

(b) a plurality of piercing units being opposedly arranged on both sides of said machine bed, each piercing unit being movable along the X-axis and Y-axis directions;

(c) each of said plurality of piercing units including a work-space having an opening facing said machine bed, wherein the workpiece passes through respective workspaces of opposed piercing units;

(d) piercing means located in each of said plurality of piercing units for piercing the workpiece at the reference marks;

(e) sensing means for locating the reference marks; and (f) a drive mechanism for moving said piercing means with respect to a corresponding piercing unit in response to a reference mark being located by said sensing means.

2. The multiple piercing apparatus according to claim 1, wherein said work-space includes a bottom floor, a hole being located at an end portion of said bottom floor, said piercing means being located below said bottom floor, and elevating means for elevating said piercing means through said hole.

3. The multiple piercing apparatus according to claim 2, wherein said piercing means is a twist drill.

4. The multiple piercing apparatus according to claim 2, and further including an elevatable workpiece clamp arranged to clamp the workpiece around the periphery of said hole.

5. The multiple piercing apparatus according to claim 2, wherein said work-space includes a ceiling, said sensing means being located on said ceiling and being substantially aligned with said hole.

6. The multiple piercing apparatus according to claim 1, wherein said sensing means is a camera.

7. The multiple piercing apparatus according to claim 2, wherein said elevating means is a fluid cylinder.

8. The multiple piercing apparatus according to claim 1, wherein said drive mechanism moves said piercing means along X-axis and Y-axis directions.

9. The multiple piercing apparatus according to claim 8, wherein said drive mechanism includes a support member for supporting said piercing means, and a motor having an eccentric cam which contacts said support member for moving said support member along at least one of said X-axis and Y-axis directions.

10. The multiple piercing apparatus according to claim 9, further including a second motor having an eccentric cam which contacts said support member for moving said support member along the other of said X-axis and Y-axis directions.

11. The multiple piercing apparatus according to claim 9, further including biasing means for biasing said support member into contact with said eccentric cam.

12. The multiple piercing apparatus according to claim 2, further including a feed roller on said bottom floor, the top of said feed roller being substantially level with said end portion of said bottom floor.

13. The multiple piercing apparatus according to claim 8, wherein said drive mechanism includes a support member for supporting said piercing means, said support member being movable along at least one of said X-axis and Y-axis directions.

14. The multiple piercing apparatus according to claim 13, wherein said support member is substantially C-shaped and includes an upper member, a lower member, and a connecting member, said support member encircling said workspace, the opening of said C-shaped support member being substantially aligned with said opening of said work-space.

15. The multiple piercing apparatus according to claim 14, wherein said piercing means is supported on said lower member of said support member.

16. The multiple piercing apparatus according to claim 15, further including elevating means for elevating said piercing means.

17. The multiple piercing apparatus according to claim 16, wherein said elevating means is a fluid cylinder which is connected to said lower member of said support member.

18. The multiple piercing apparatus according to claim 14, wherein said sensing means is supported on said upper member of said support member.

19. The multiple piercing apparatus according to claim 18, further comprising elevating means for elevating said sensing means.

20. The multiple piercing apparatus according to claim 14, wherein said drive mechanism includes a jackscrew having a cooperating element connected to said support member for moving said support member along at least one of said X-axis and Y-axis directions.

21. The multiple piercing apparatus according to claim 20, further including a second jackscrew for moving said support member along the other of said X-axis and Y-axis directions.

22. The multiple piercing apparatus according to claim 20, wherein said cooperating element is connected to said lower member of said C-shaped support member.

23. The multiple piercing apparatus according to claim 1, wherein said sensing means is a photo-sensor.

24. The multiple piercing apparatus according to claim 1, wherein said work-space and piercing means are disposed in a unit case, said drive mechanism moving said unit case along at least one of X-axis and Y-axis directions.

25. The multiple piercing apparatus according to claim 24, wherein said work-space includes a bottom floor and a ceiling, said piercing means being disposed in said ceiling.

26. The multiple piercing apparatus according to claim 25, wherein said piercing means is a punch assembly.

27. The multiple piercing apparatus according to claim 26, including a die located at an end portion of said bottom floor, said die being substantially aligned with said punch assembly.

28. The multiple piercing apparatus according to claim 27, wherein said die includes an upper surface that is substantially level with said bottom floor.

29. The multiple piercing apparatus according to claim 25, including reciprocating means for lowering and raising said piercing means.

30. The multiple piercing apparatus according to claim 29, wherein said reciprocating means is a fluid cylinder disposed in said unit case.

31. The multiple piercing apparatus according to claim 25, wherein said sensing means is disposed in said ceiling.

32. The multiple piercing apparatus according to claim 24, wherein said drive mechanism includes at least one rail connected to said machine bed, and means for moving said unit case along said rail in at least one of said X-axis and Y-axis directions.

33. The multiple piercing apparatus according to claim 32, wherein said at least one rail is movable in the other of said X-axis and Y-axis directions.

34. The multiple piercing apparatus according to claim 32, wherein said means for moving includes a jackscrew cooperating with said unit case, said jackscrew being driven by a motor connected to said at least one rail.

35. The multiple piercing apparatus according to claim 33, wherein said at least one rail is movable by a jackscrew which is driven by a motor.

36. The multiple piercing apparatus according to claim 9, wherein said support member includes a first portion for moving said piercing means along said Y-axis direction and a second portion for moving said piercing means along the X-axis direction.

37. The multiple piercing apparatus according to claim 36, wherein said second portion is slidable relative to said first portion in the X-axis direction.

38. The multiple piercing apparatus according to claim 37, including a second motor having an eccentric cam which contacts said support member for moving said support member along the other of said X-axis and Y-axis directions.

39. The multiple piercing apparatus according to claim 36, wherein said first portion is pivotally mounted on said piercing unit.

40. The multiple piercing apparatus according to claim 2, further including an exhaust portion below said hole, and an air jet nozzle in said exhaust portion for discharging any portion of the workpiece removed by said piercing means.

41. A method of piercing a workpiece, the workpiece having reference marks defining the locations on the workpiece to be pierced, the method comprising:

(a) conveying the workpiece along a conveying path;
(b) providing at least one piercing unit having piercing means along said conveying path;
(c) sensing a reference mark by sensing means and stopping the conveyance of the workpiece;
(d) processing data from said sensing means to determine the coordinates of the reference mark;
(e) moving a piercing means to the coordinates of the reference mark; and
(f) piercing the workpiece.

42. The method of piercing a workpiece according to claim 41, wherein said step of providing at least one piercing unit includes providing a plurality of opposedly arranged piercing units on both sides of said conveying path.

43. The method of piercing a workpiece according to claim 41, further comprising adjustably mounting said at least one piercing unit for movement along X-axis and Y-axis directions with respect to said conveying path.

44. The method of piercing a workpiece according to claim 41, further comprising clamping the workpiece while it is being pierced.

45. The method of piercing a workpiece according to claim 41, including elevating said piercing means to pierce the workpiece.

46. The method of piercing a workpiece according to claim 41, including lowering said piercing means to pierce the workpiece.

47. The method of piercing a workpiece according to claim 41, including supporting said piercing means on a support member and moving said support member with respect to said piercing unit so that said piercing means is substantially aligned with a reference mark.

48. The method of piercing a workpiece according to claim 47, wherein said support member is moved along the X-axis and Y-axis directions.

49. The method of piercing a workpiece according to claim 47, wherein said support member is moved by at least one motor driving an eccentric cam which contacts said support member.

50. The method of piercing a workpiece according to claim 49, further comprising biasing said support member against said eccentric cam.

51. The method of piercing a workpiece according to claim 47, wherein said support member is moved by at least one jackscrew which is driven by a motor.

52. The method of piercing a workpiece according to claim 41, wherein said step of piercing the workpiece comprises piercing with a twist drill.

53. The method of piercing a workpiece according to claim 41, wherein said step of piercing the workpiece comprises piercing with a punch assembly.

54. The method of piercing a workpiece according to claim 41, further comprising emitting an air jet to discharge any portion of the workpiece removed by said piercing means.

* * * * *